United States Patent
Mulcahy et al.

(10) Patent No.: US 11,954,602 B1
(45) Date of Patent: Apr. 9, 2024

(54) HYBRID-INPUT PREDICTIVE DATA ANALYSIS

(71) Applicant: Optum, Inc., Minnetonka, MN (US)

(72) Inventors: Daniel J. Mulcahy, Cambridge, MA (US); Subhash Seelam, Exton, PA (US); Damian Kelly, Kildare (IE); Vijay S. Nori, Roswell, GA (US); Adam Russell, Arlington, MA (US)

(73) Assignee: Optum, Inc., Minnetonka, MN (US)

( * ) Notice: Subject to any disclaimer, the term of this patent is extended or adjusted under 35 U.S.C. 154(b) by 661 days.

(21) Appl. No.: 16/792,635

(22) Filed: Feb. 17, 2020

Related U.S. Application Data

(60) Provisional application No. 62/872,455, filed on Jul. 10, 2019.

(51) Int. Cl.
*G06N 5/02* (2023.01)
*G06F 40/284* (2020.01)
*G06N 20/00* (2019.01)

(52) U.S. Cl.
CPC ............. *G06N 5/02* (2013.01); *G06F 40/284* (2020.01); *G06N 20/00* (2019.01)

(58) Field of Classification Search
CPC .................................................... G06F 40/284
See application file for complete search history.

(56) References Cited

U.S. PATENT DOCUMENTS

| | | | |
|---|---|---|---|
| 9,798,788 B1 * | 10/2017 | Reiner | G06F 16/254 |
| 10,122,824 B1 * | 11/2018 | Chokhawala | H04L 67/63 |
| 11,003,369 B1 * | 5/2021 | Bernat | G06F 9/4401 |
| 11,120,364 B1 * | 9/2021 | Gokalp | G06N 20/00 |
| 2006/0206013 A1 | 9/2006 | Rothman et al. | |
| 2009/0089383 A1 * | 4/2009 | Ngan | G06F 15/16 709/206 |
| 2009/0105550 A1 | 4/2009 | Rothman et al. | |
| 2011/0119218 A1 * | 5/2011 | Lay | G06F 21/577 706/46 |

(Continued)

FOREIGN PATENT DOCUMENTS

WO   WO-2018231187 A1 * 12/2018   ......... G06F 16/2453

*Primary Examiner* — Anne L Thomas-Homescu
(74) *Attorney, Agent, or Firm* — Alston & Bird LLP

(57) ABSTRACT

There is a need for more effective and efficient predictive data analysis. This need can be addressed by, for example, solutions for performing/executing hybrid input predictive data analysis. In one example, a method includes identifying a vocabulary data object associated with one or more prediction input text data objects; determining, based at least in part on the vocabulary data object, a per-input-entity tokenized representation for the one or more prediction input text data objects; determining, based at least in part on the per-input-entity tokenized representation and one or more prediction input structured data objects and using a hybrid-input predictive model, a prediction score; determining, based at least in part on one or more threshold determination configuration criteria, a predictive threshold for the hybrid-input predictive model; generating, based at least in part on the prediction score and the predictive threshold, a predictive output; and performing one or more prediction-based actions based at least in part on the predictive output.

19 Claims, 16 Drawing Sheets

(56) References Cited

U.S. PATENT DOCUMENTS

| | | | | |
|---|---|---|---|---|
| 2013/0066886 A1* | 3/2013 | Bagchi | ................ | G06F 16/3329 |
| | | | | 707/E17.071 |
| 2013/0262357 A1* | 10/2013 | Amarasingham | ...... | G16H 50/70 |
| | | | | 706/21 |
| 2016/0078367 A1* | 3/2016 | Adjaoute | ............... | G06N 20/00 |
| | | | | 706/12 |
| 2017/0140755 A1* | 5/2017 | Andreas | .................. | G10L 25/51 |
| 2018/0219887 A1* | 8/2018 | Luo | ......................... | G06F 21/55 |
| 2018/0268818 A1* | 9/2018 | Schoenmackers | ...... | G10L 15/26 |
| 2018/0329883 A1* | 11/2018 | Leidner | ................. | G06F 40/247 |
| 2019/0147101 A1* | 5/2019 | Nitka | .................. | G06F 16/2474 |
| | | | | 707/714 |
| 2019/0155905 A1* | 5/2019 | Bachrach | ................ | G06F 40/30 |
| 2019/0171986 A1* | 6/2019 | Beznos | .................... | G06N 5/04 |
| 2019/0236155 A1* | 8/2019 | Bachrach | ............. | G06F 16/243 |
| 2019/0251165 A1* | 8/2019 | Bachrach | ............. | G06N 3/044 |
| 2019/0340235 A1* | 11/2019 | Osbourne | ............ | G10L 19/083 |
| 2019/0340945 A1* | 11/2019 | Malhotra | ............... | G06N 3/084 |
| 2019/0392082 A1* | 12/2019 | Bell | ......................... | G06N 3/08 |
| 2020/0174433 A1* | 6/2020 | Hughes | ................ | G06T 11/206 |
| 2020/0175360 A1* | 6/2020 | Conti | ................ | G06F 16/2282 |
| 2020/0249918 A1* | 8/2020 | Svyatkovskiy | ........... | G06F 8/33 |
| 2020/0250417 A1* | 8/2020 | Torres | .................. | G06F 40/216 |
| 2020/0257757 A1* | 8/2020 | Chawla | .................... | G06F 40/20 |
| 2020/0301672 A1* | 9/2020 | Li | ............................ | G06F 8/73 |
| 2020/0302296 A1* | 9/2020 | Miller | .................... | G06Q 50/20 |
| 2020/0311615 A1* | 10/2020 | Jammalamadaka | ... | G06N 20/20 |
| 2021/0012102 A1* | 1/2021 | Cristescu | ............. | G06V 30/412 |
| 2021/0223864 A1* | 7/2021 | Forsland | .............. | G06F 1/1694 |

* cited by examiner

700

| Term | Token |
|---|---|
| no | 0001 |
| fever | 0008 |
| change | 0002 |
| bowel | 0033 |
| urinary | 0035 |

FIG. 7

HYBRID-INPUT PREDICTIVE DATA ANALYSIS

CROSS REFERENCE TO RELATED APPLICATIONS

This application claims the benefit of U.S. Provisional Patent Applications No. 62/872,455 filed Jul. 10, 2019, which is incorporated by reference herein in its entirety.

BACKGROUND

Various embodiments of the present invention address technical challenges related to performing predictive data analysis. Various embodiments of the present address the shortcomings of existing predictive data analysis systems and disclose various techniques for efficiently and reliably performing predictive data analysis.

BRIEF SUMMARY

In general, embodiments of the present invention provide methods, apparatus, systems, computing devices, computing entities, and/or the like for performing hybrid input predictive data analysis. Certain embodiments utilize systems, methods, and computer program products that predictive data analysis using offline-generated vocabulary data objects and offline-generated predictive thresholds that may be adjusted during online phases. In accordance with one aspect, a method is provided. In one embodiment, the method comprises identifying a vocabulary data object associated with one or more prediction input natural language data objects, wherein (i) the vocabulary data object identifies one or more tokenized terms and a per-term tokenized representation for each tokenized term of the one or more tokenized terms, and (ii) the one or more tokenized terms are determined based at least in part on each cross-object frequency measure for a selected training term of one or more selected training terms used in one or more training natural language data objects; determining, based at least in part on the vocabulary data object, a per-input-entity tokenized representation for the one or more prediction input natural language data objects, wherein (i) the one or more input natural language data objects comprise one or more input terms, (ii) the one or more input terms comprise one or more mapped input terms having a respective tokenized representation identified by the vocabulary data object, and (ii) the per-input-entity tokenized representation comprises the per-term tokenized representation for each mapped input term of the one or more mapped input terms; determining, based at least in part on the per-input-entity tokenized representation and the one or more prediction input structured data objects and using a hybrid-input predictive model, a prediction score for a predictive entity; determining, based at least in part on one or more threshold determination configuration criteria, a predictive threshold for the hybrid-input predictive model; generating, based at least in part on the prediction score and the predictive threshold, a predictive output associated with the input predictive entity; and initiating the performance of one or more prediction-based actions based at least in part on the predictive output.

In accordance with another aspect, a computer program product is provided. The computer program product may comprise at least one computer-readable storage medium having computer-readable program code portions stored therein, the computer-readable program code portions comprising executable portions configured to identify a vocabulary data object associated with one or more prediction input natural language data objects, wherein (i) the vocabulary data object identifies one or more tokenized terms and a per-term tokenized representation for each tokenized term of the one or more tokenized terms, and (ii) the one or more tokenized terms are determined based at least in part on each cross-object frequency measure for a selected training term of one or more selected training terms used in one or more training natural language data objects; determine, based at least in part on the vocabulary data object, a per-input-entity tokenized representation for the one or more prediction input natural language data objects, wherein (i) the one or more input natural language data objects comprise one or more input terms, (ii) the one or more input terms comprise one or more mapped input terms having a respective tokenized representation identified by the vocabulary data object, and (ii) the per-input-entity tokenized representation comprises the per-term tokenized representation for each mapped input term of the one or more mapped input terms; determine, based at least in part on the per-input-entity tokenized representation and the one or more prediction input structured data objects and using a hybrid-input predictive model, a prediction score for a predictive entity; determine, based at least in part on one or more threshold determination configuration criteria, a predictive threshold for the hybrid-input predictive model; generating, based at least in part on the prediction score and the predictive threshold, a predictive output associated with the input predictive entity; and initiate the performance of one or more prediction-based actions based at least in part on the predictive output.

In accordance with yet another aspect, an apparatus comprising at least one processor and at least one memory including computer program code is provided. In one embodiment, at least one memory and the computer program code may be configured to, with the processor, cause the apparatus to identify a vocabulary data object associated with one or more prediction input natural language data objects, wherein (i) the vocabulary data object identifies one or more tokenized terms and a per-term tokenized representation for each tokenized term of the one or more tokenized terms, and (ii) the one or more tokenized terms are determined based at least in part on each cross-object frequency measure for a selected training term of one or more selected training terms used in one or more training natural language data objects; determine, based at least in part on the vocabulary data object, a per-input-entity tokenized representation for the one or more prediction input natural language data objects, wherein (i) the one or more input natural language data objects comprise one or more input terms, (ii) the one or more input terms comprise one or more mapped input terms having a respective tokenized representation identified by the vocabulary data object, and (ii) the per-input-entity tokenized representation comprises the per-term tokenized representation for each mapped input term of the one or more mapped input terms; determine, based at least in part on the per-input-entity tokenized representation and the one or more prediction input structured data objects and using a hybrid-input predictive model, a prediction score for a predictive entity; determine, based at least in part on one or more threshold determination configuration criteria, a predictive threshold for the hybrid-input predictive model; generating, based at least in part on the prediction score and the predictive threshold, a predictive output associated with the input predictive entity; and initiate the performance of one or more prediction-based actions based at least in part on the predictive output.

BRIEF DESCRIPTION OF THE DRAWINGS

Figure 1:
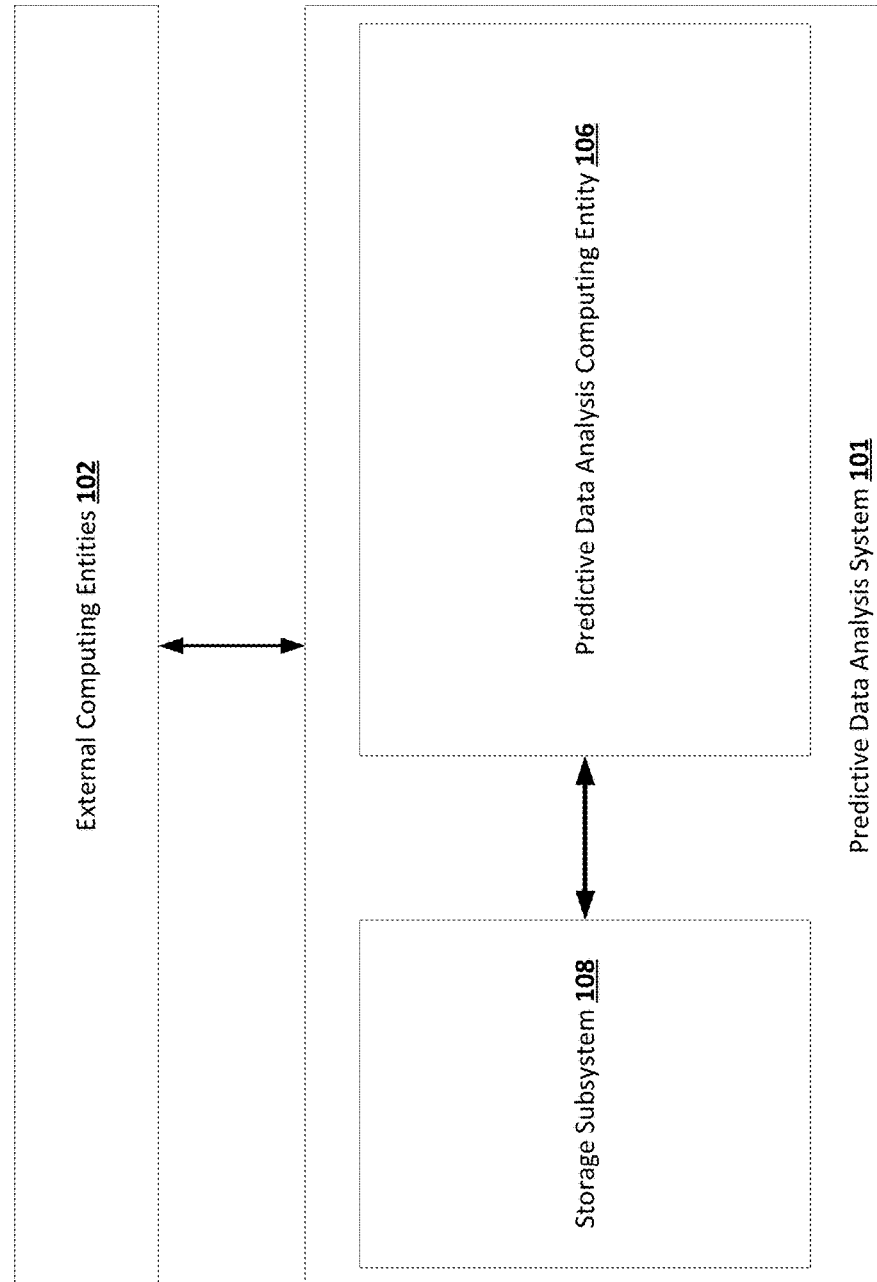

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
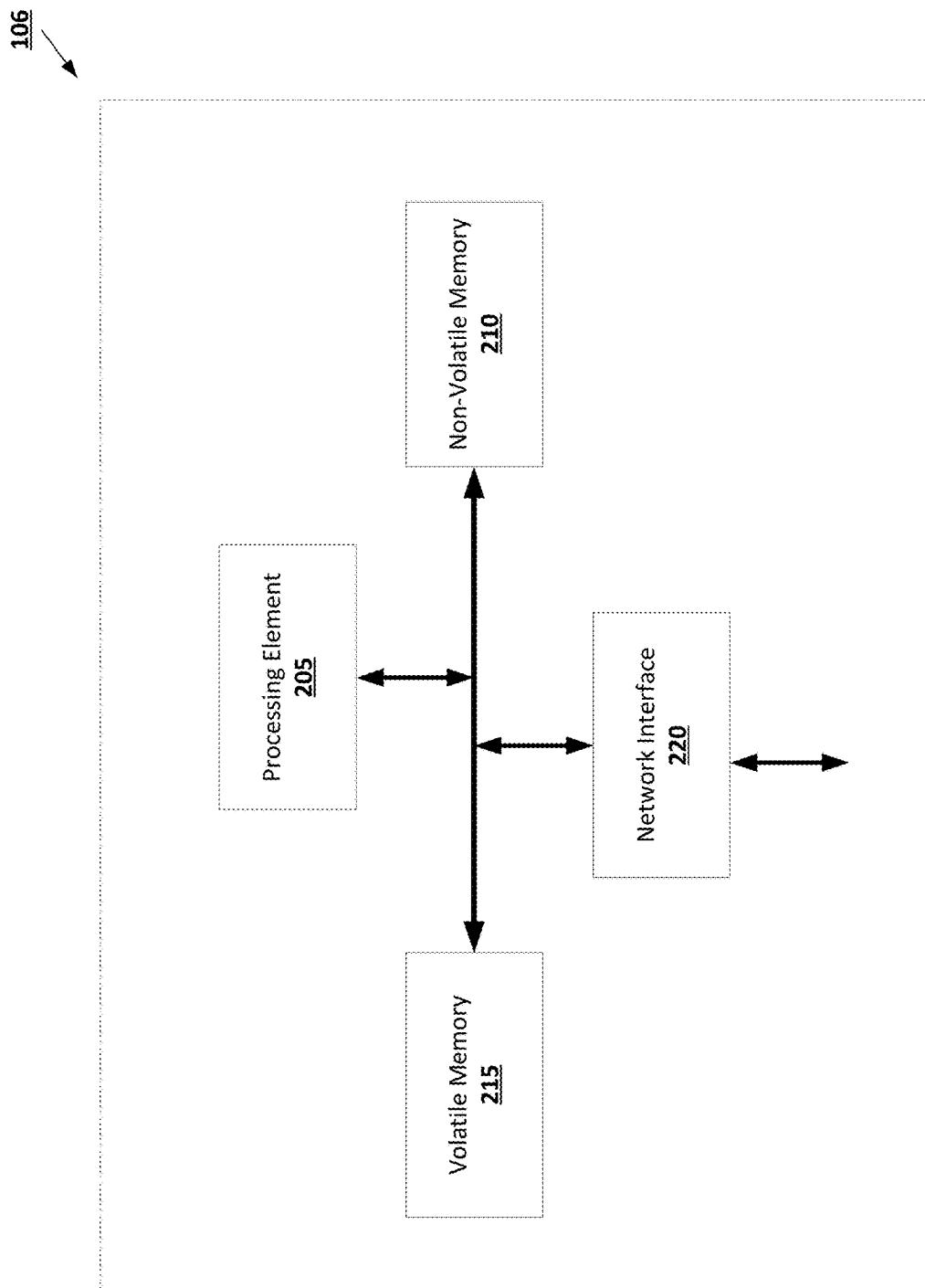

FIG. 2 provides an example predictive data analysis computing entity in accordance with some embodiments discussed herein.

Figure 3:
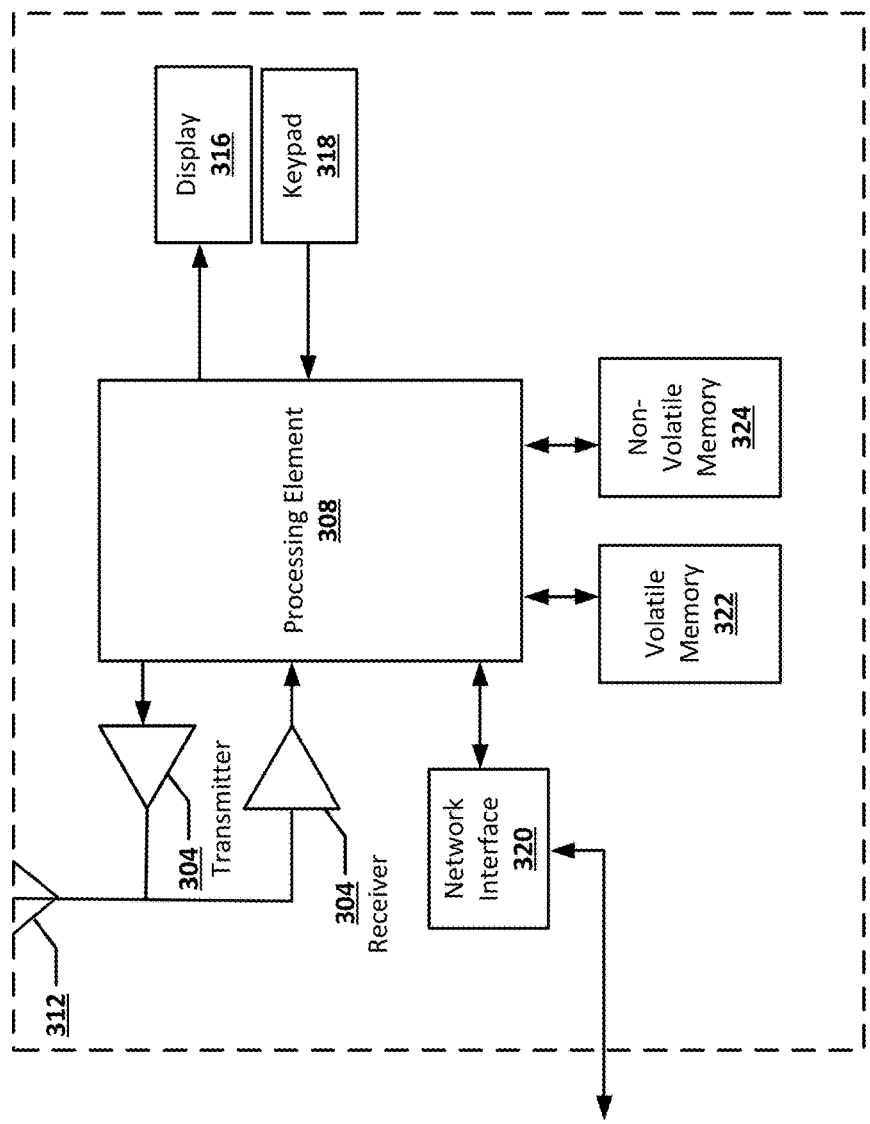

FIG. 3 provides an example external computing entity in accordance with some embodiments discussed herein.

Figure 4:
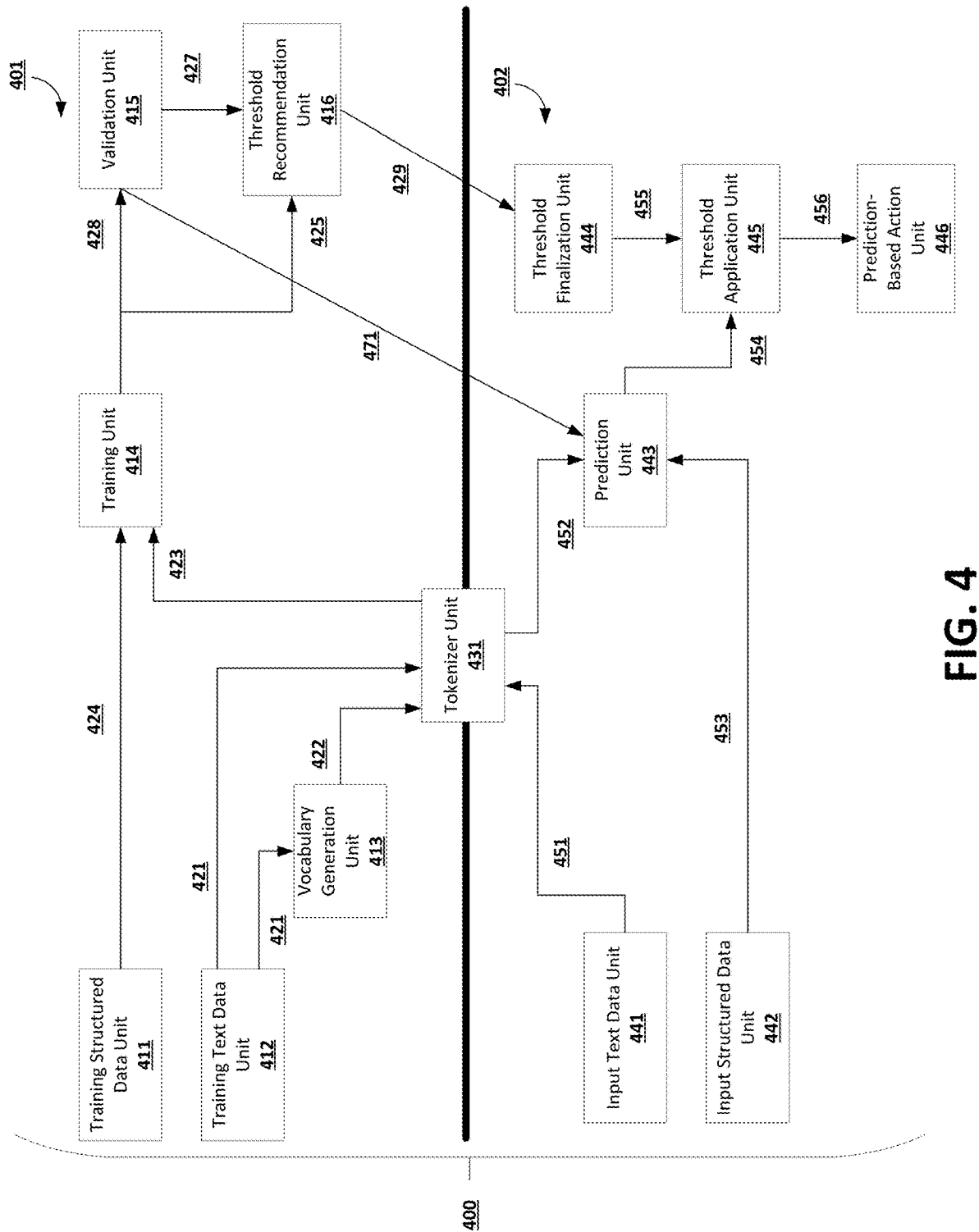

FIG. 4 is a data flow diagram of an example process for performing hybrid input predictive data analysis in accordance with some embodiments discussed herein.

Figure 5:
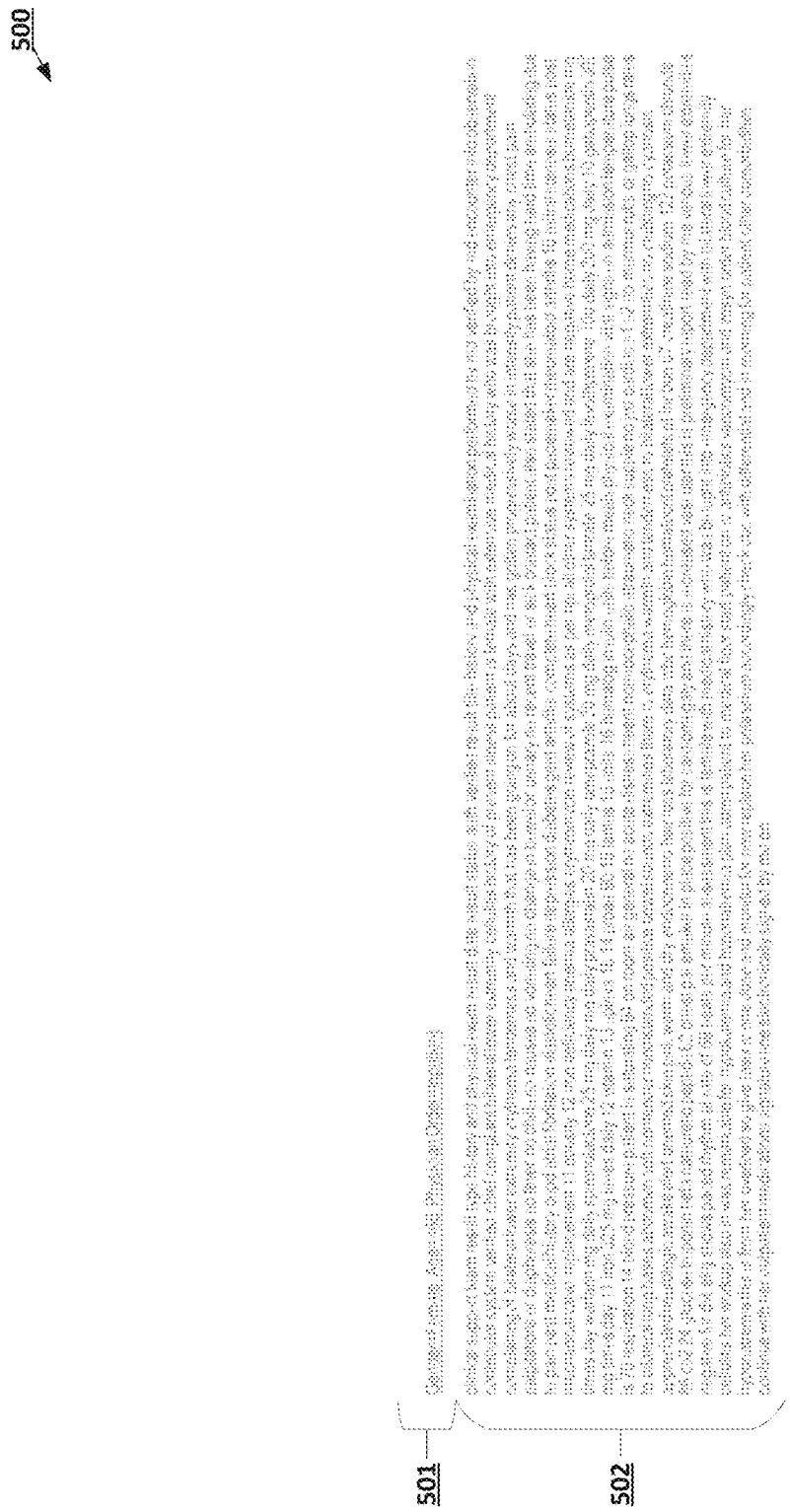

FIG. 5 provides an operational example of a hybrid predictive input in accordance with some embodiments discussed herein.

Figure 6:
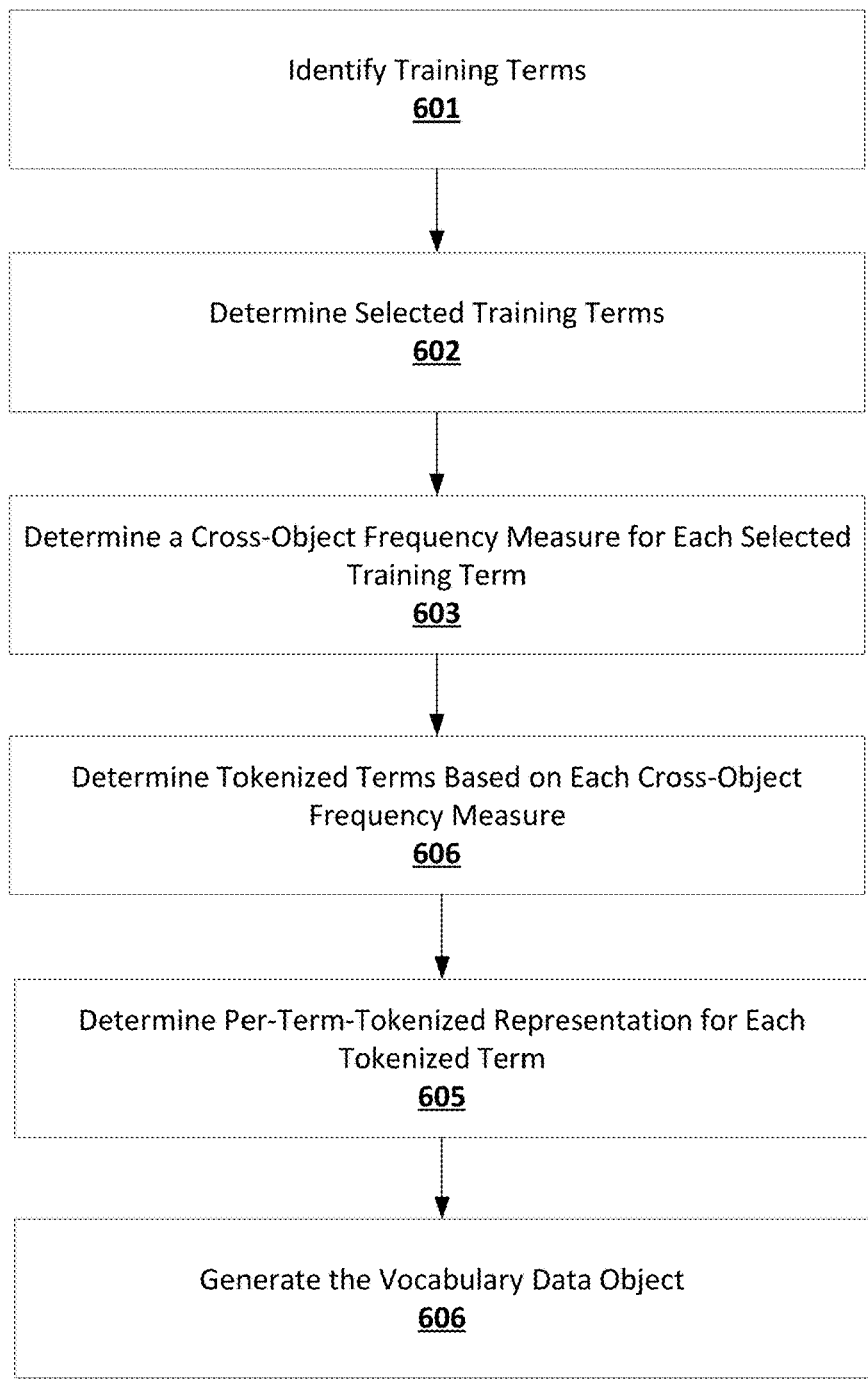

FIG. 6 is a flowchart diagram of an example process for generating a vocabulary data object in accordance with some embodiments discussed herein.

FIG. 7 provides an operational example of a vocabulary data object in accordance with some embodiments discussed herein.

Figure 8:
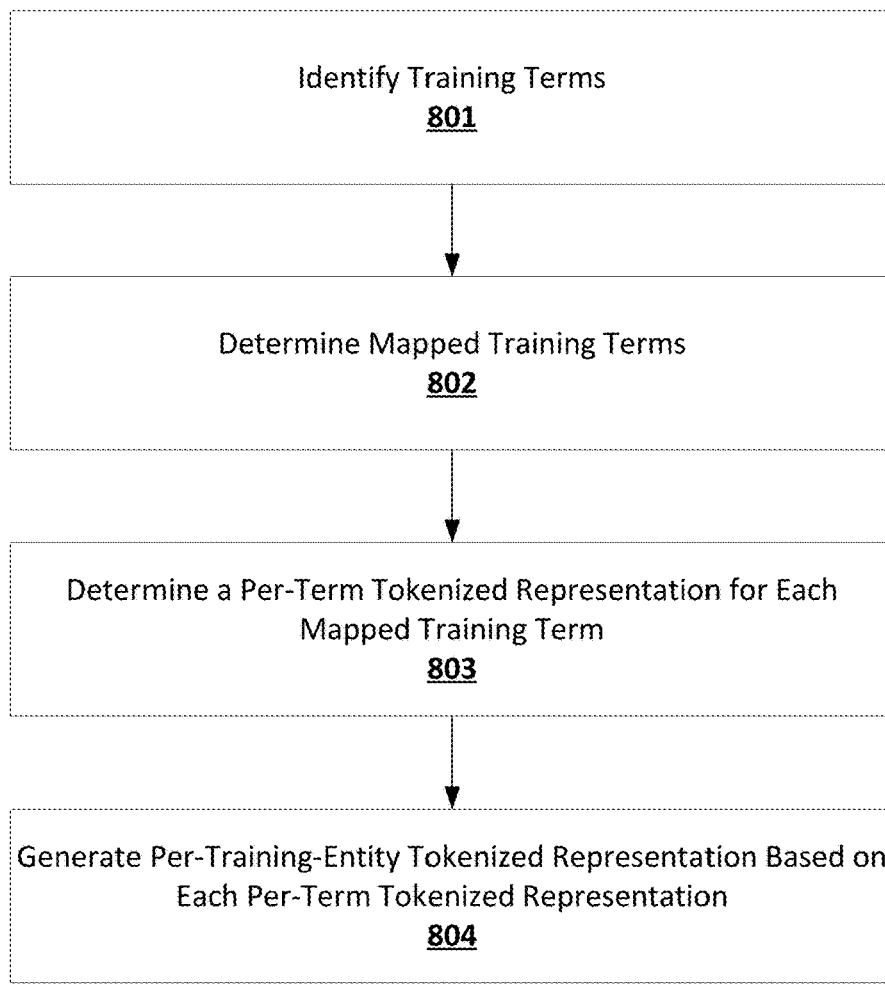

FIG. 8 is a flowchart diagram of an example process for generating a per-training-entity tokenized representation associated with a training predictive entity in accordance with some embodiments discussed herein.

Figure 9:
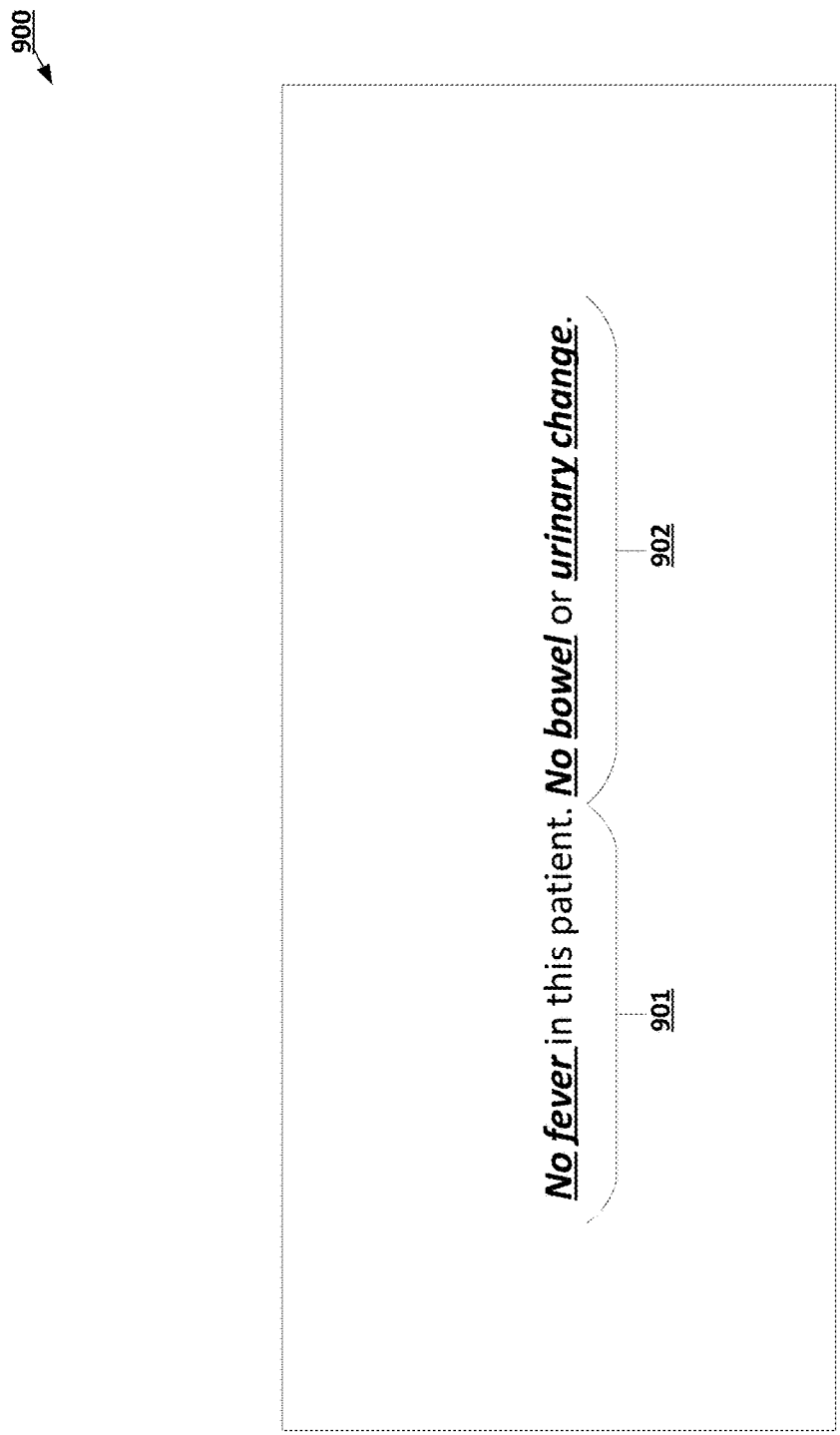

FIG. 9 provides an operational example of a text data object in accordance with some embodiments discussed herein.

Figure 10:
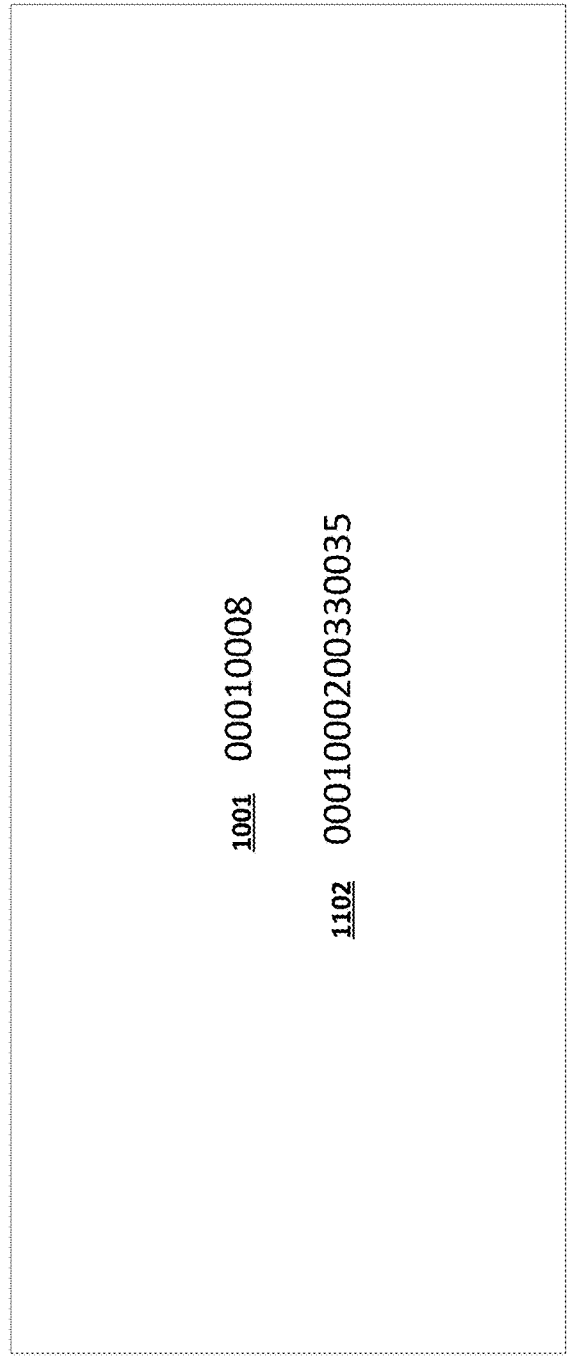

FIG. 10 provides an operational example of a per-entity tokenized representation of a text document in accordance with some embodiments discussed herein.

Figure 11:
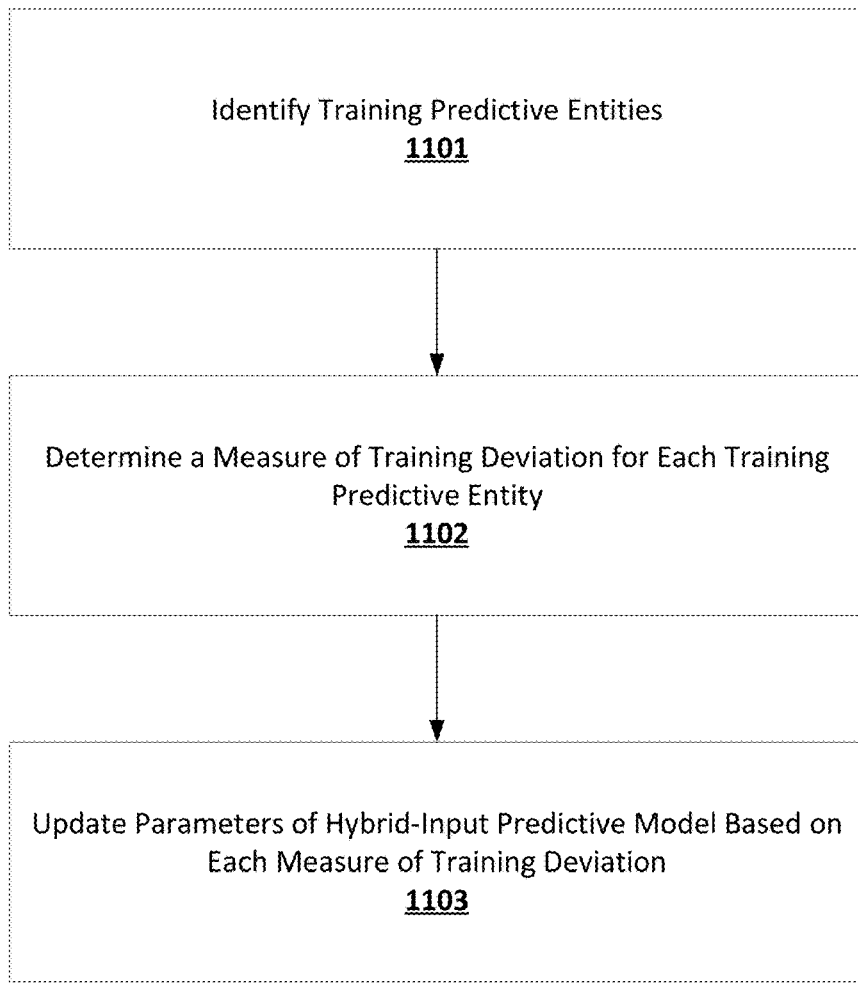

FIG. 11 is a flowchart diagram of an example process for generating a trained hybrid-input predictive model in accordance with some embodiments discussed herein.

Figure 12:
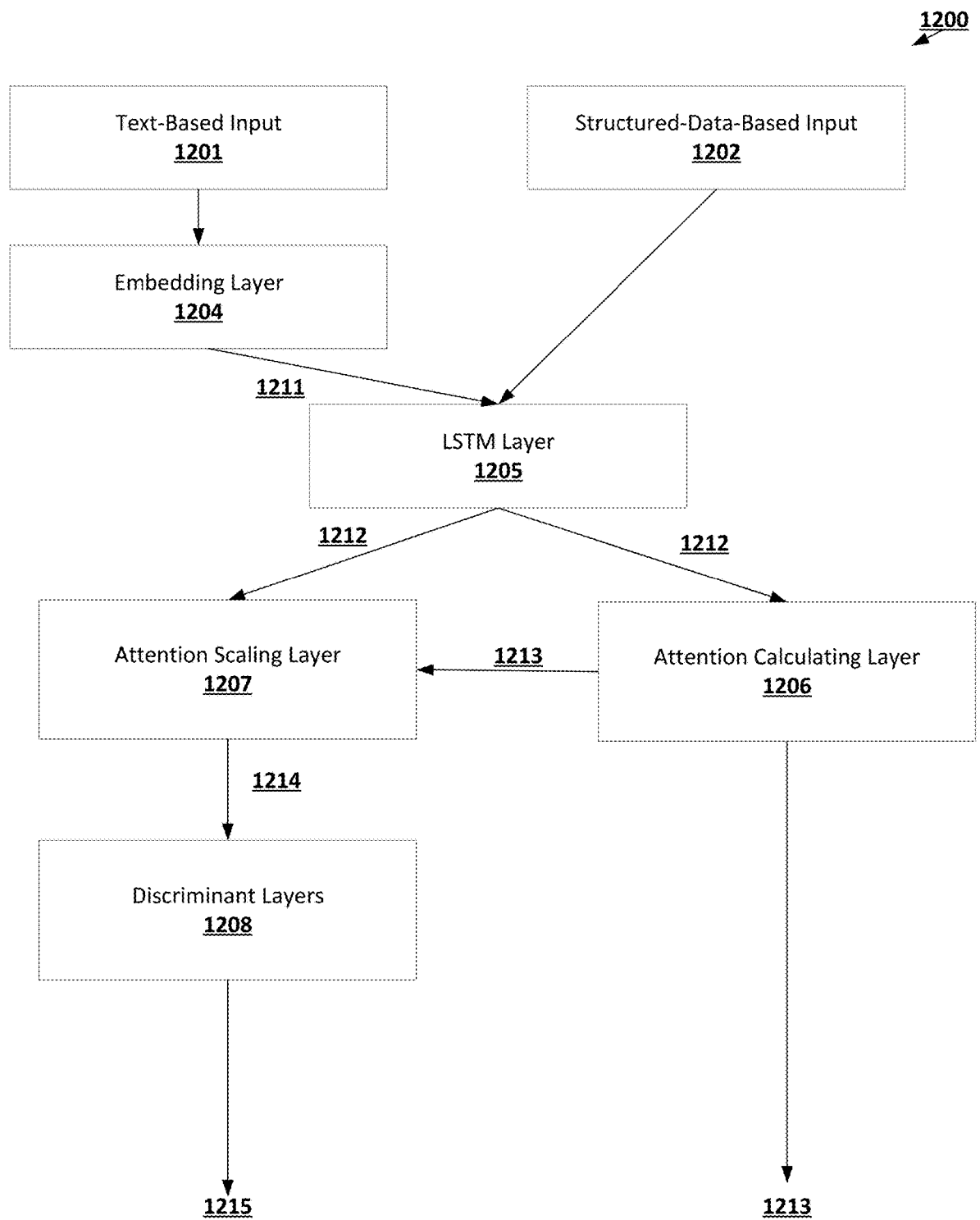

FIG. 12 provides an operational example of a hybrid-input predictive model in accordance with some embodiments discussed herein.

Figure 13:
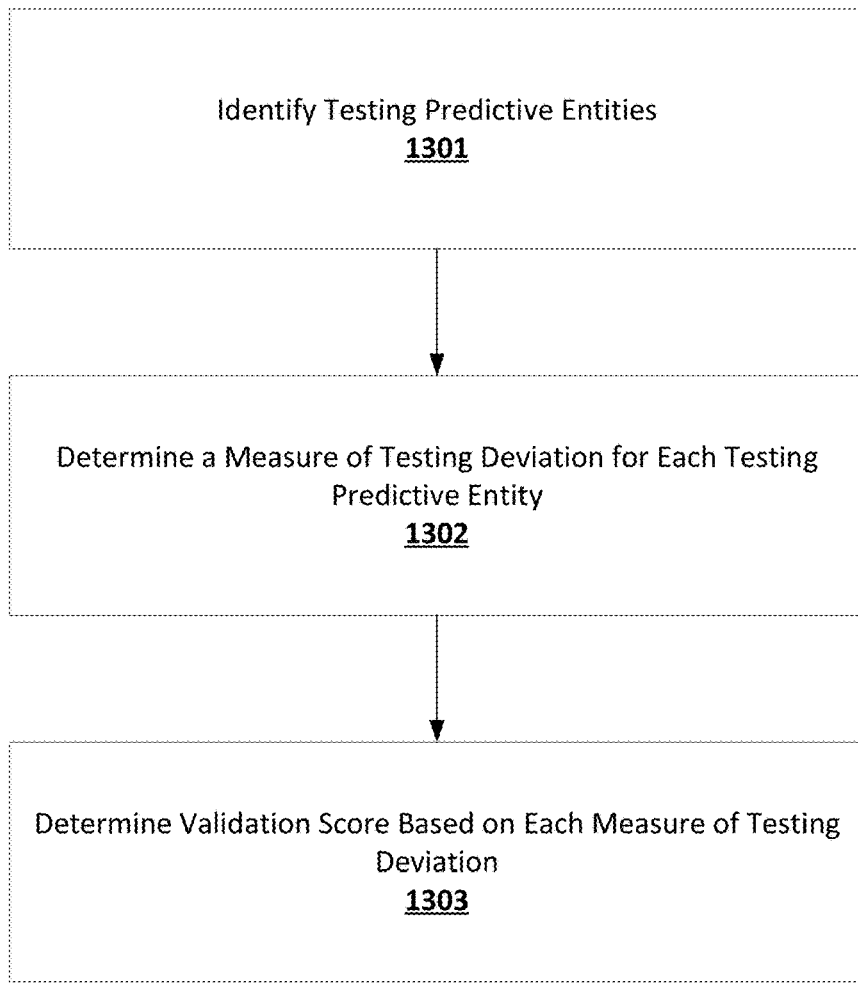

FIG. 13 is a flowchart diagram of an example process for validating a trained hybrid-input predictive model in accordance with some embodiments discussed herein.

Figure 14:
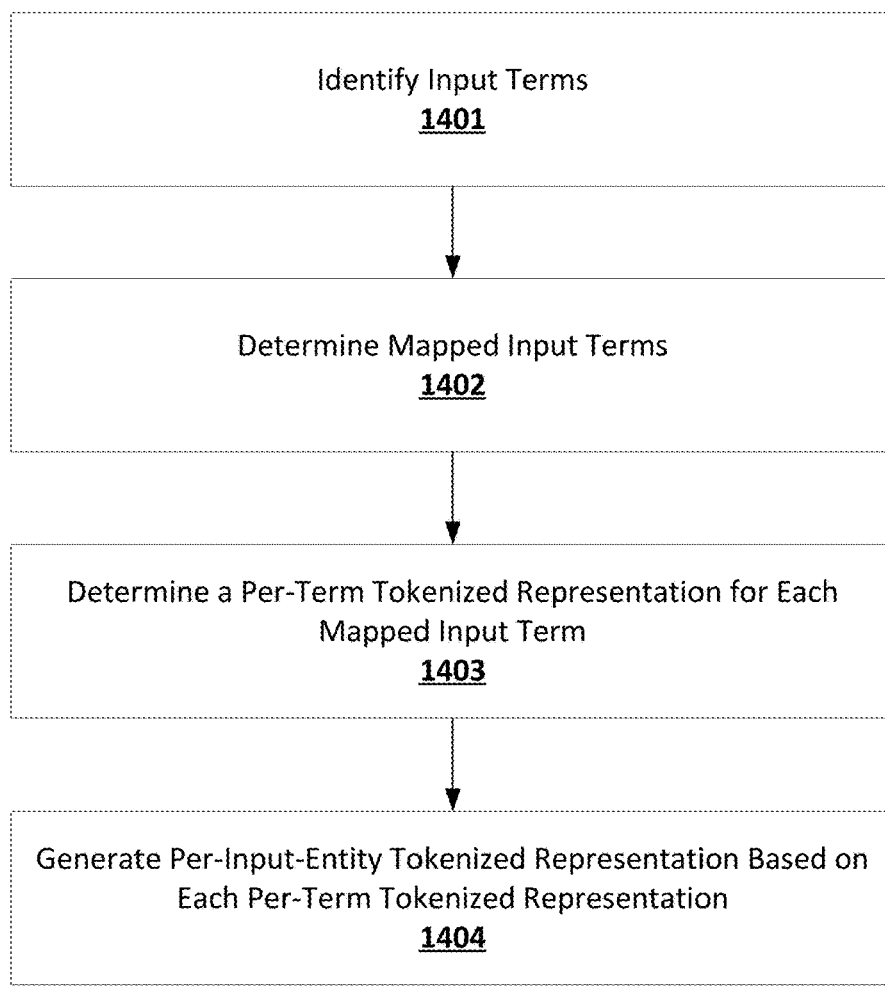

FIG. 14 is a flowchart diagram of an example process for generating a per-prediction-entity tokenized representation associated with an input predictive entity in accordance with some embodiments discussed herein.

Figure 15:
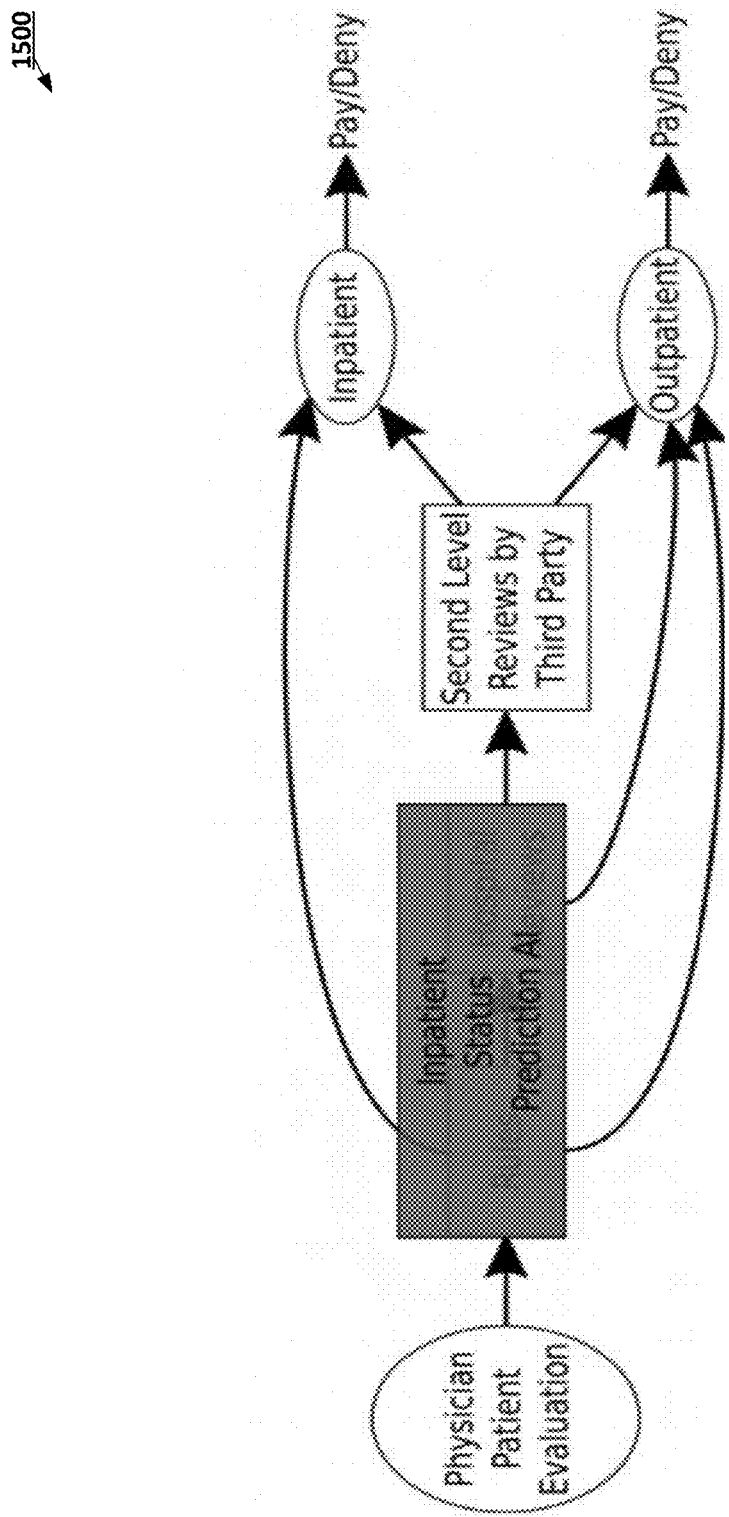

FIG. 15 is a flowchart diagram of an example process for performing a prediction-based action based at least in part on necessity-of-care predictions in accordance with some embodiments discussed herein.

Figure 16:
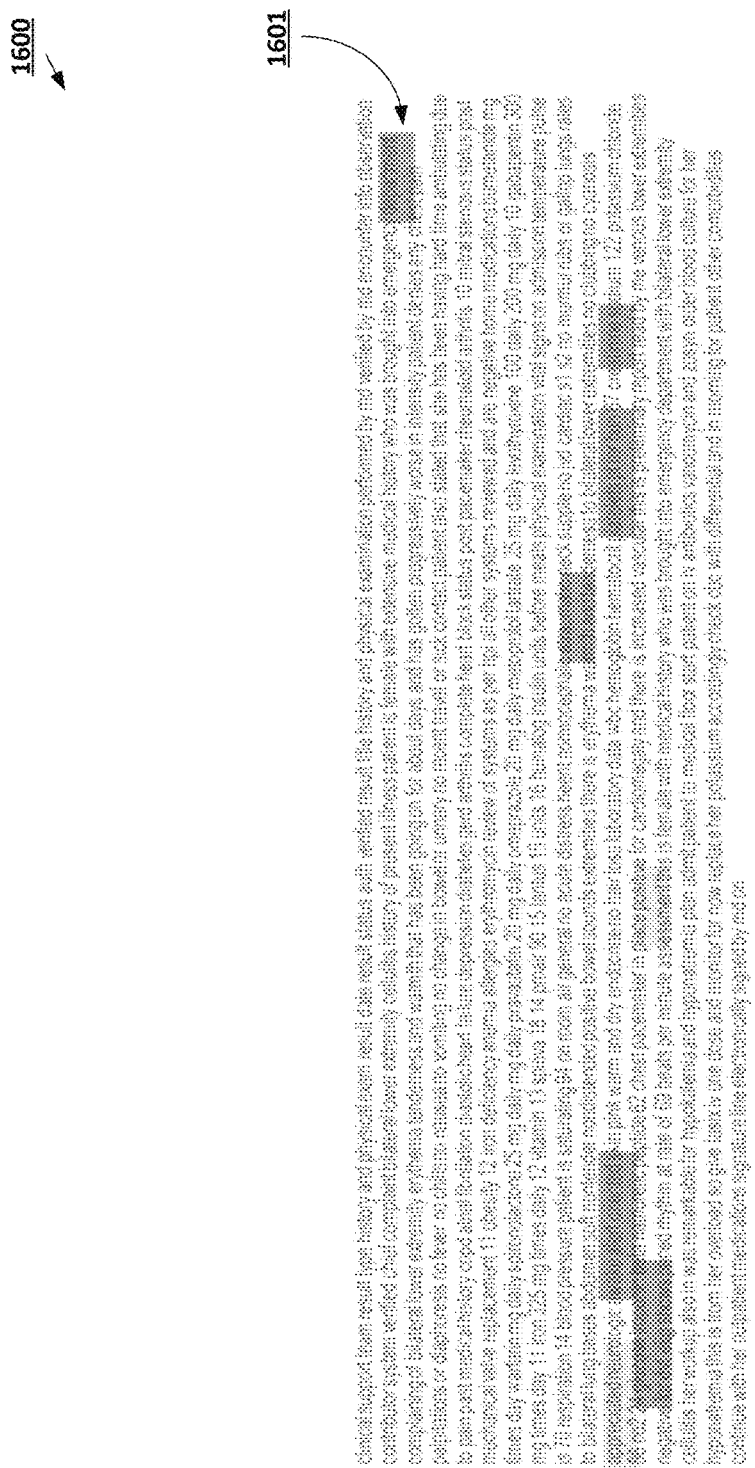

FIG. 16 provides an operational example of a highlighted text data object in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

As used herein, a hybrid input predictive data analysis task may be a predictive data analysis task whose input space may include both structured data and unstructured data (e.g., unstructured text data, such as unstructured natural language text data). Hybrid input predictive data analysis task present unique problems for various existing predictive data analysis systems. For example, because processing unstructured data is typically more time-consuming than processing structured data, performing hybrid input predictive data analysis task involves an input processing asymmetry that can cause a bottleneck for a predictive data analysis system that is tasked to perform a hybrid input predictive data analysis task. The noted input processing asymmetry can undermine computational efficiency of performing input predictive data analysis tasks on the noted existing predictive data analysis systems.

To address the above-described shortcomings of various existing predictive data analysis systems, various embodiments of the present invention propose techniques that can decrease the input processing asymmetry associated with processing unstructured data when performing hybrid input predictive data analysis tasks. For example, some embodiments of the present invention propose generating vocabulary data objects during offline phases (e.g., training phases) of performing hybrid input predictive data analysis tasks. In some of the noted embodiments, a proposed system generates, during an offline phase of performing hybrid input predictive data analysis, a vocabulary data object associated with the one or more prediction input text data objects that identifies one or more tokenized terms and a per-term tokenized representation for each tokenized term of the one or more tokenized terms, where the one or more tokenized terms are determined based at least in part on each cross-object frequency measure for a selected training term of one or more selected training terms used in one or more training text data objects. The proposed system can then, during an online phase (e.g., an inference phase) of performing hybrid input predictive data analysis, utilize the vocabulary data object to define a structure for performing processing of the text data object.

By utilizing the above-described techniques and other similar techniques described herein, various embodiments of the present invention can improve effectiveness and computability of conventional predictive data analysis solutions by presenting text data as numeric representations. Moreover, by utilizing the above-described techniques and other similar techniques described herein, various embodiments of the present invention can limit the amount of feature extractions from a text document based on evaluating performance of the vocabulary models used to perform such feature extractions. In this way, the noted embodiments of the present invention improve the effectiveness and reliability of performing hybrid input predictive data analysis tasks.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 is a schematic diagram of an example architecture 100 for performing hybrid input predictive data analysis. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions. An example of a predictive data analysis task is generating health-related predictions (e.g., predictions based at least in part on whether a medical case is properly classified as inpatient) based at least in part on genetic input data associated with a patient and performing prediction-based actions based at least in part on the generated health-related predictions.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate the generated predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may further store underlying real-world measurement data and/or underlying real-world observation data used to determine per-feature correlation values and per-marker correlation values as part of performing predictive data analysis using custom-parameterized dimensionality reduction. The storage subsystem 108 may further store information about how to perform automated prediction-based actions based at least in part on particular generated predictions.

The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

1. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

2. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as: the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. Exemplary System Operations

To address numerous described shortcomings of various existing predictive data analysis systems, various embodiments of the present invention propose techniques that can decrease the input processing asymmetry associated with processing unstructured data when performing hybrid input predictive data analysis tasks. For example, some embodiments of the present invention propose generating vocabulary data objects during offline phases (e.g., training phases) of performing hybrid input predictive data analysis tasks. In some of the noted embodiments, a proposed system generates, during an offline phase of performing hybrid input predictive data analysis, a vocabulary data object associated with the one or more prediction input text data objects that identifies one or more tokenized terms and a per-term tokenized representation for each tokenized term of the one or more tokenized terms, where the one or more tokenized terms are determined based at least in part on each cross-object frequency measure for a selected training term of one or more selected training terms used in one or more training text data objects. The proposed system can then, during an online phase (e.g., an inference phase) of performing hybrid input predictive data analysis, utilize the vocabulary data object to define a structure for performing processing of the text data object.

FIG. 4 is a data flow diagram of an example process 400 for performing hybrid input predictive data analysis using a hybrid-input predictive model. The hybrid-input predictive model may be any predictive model (e.g., any machine learning model) configured to process hybrid prediction inputs (i.e., prediction inputs comprising structured data and unstructured data, such as unstructured text data) to generate predictive outputs and/or perform prediction-based actions. An operational example of a hybrid prediction input 500 having a structured component 501 and an unstructured component 502 is presented in FIG. 5.

The process 400 includes an offline phase 401 and an online phase 402. During the offline phase 401 of the process 400, the predictive data analysis computing entity 106 generates a hybrid-input predictive model 461, a vocabulary data object 422, and a predictive threshold 455. During the online phase 402 of the process 400, the predictive data analysis computing entity 106 utilizes the hybrid-input predictive model 461, the vocabulary data object 422, and the predictive threshold 455 to generate predictive outputs and perform prediction-based actions. The offline phase 401 of the process 400 is described in the first section and the online phase 402 of the process 400 is described in the second section.

1. Exemplary Offline Phase of Hybrid Input Predictive Data Analysis

As depicted in FIG. 4, the offline phase 401 of the process 400 begins when a vocabulary generation unit 413 of the predictive data analysis computing entity 106 retrieves training text data objects 421 from a training text data unit 411 of the storage subsystem 108. An example of a training text data object 421 is a text document (e.g., a physician evaluation document and/or physician note document) used for generating trained parameters of the hybrid-input predictive model 461. The training text data objects may be associated with one or more training predictive entities. A training predictive entity may be a predictive entity whose corresponding input information and ground-truth predictive output information are used during a training process in order to generate a predictive model, e.g., the hybrid-input predictive model 461. In general, a predictive entity may be a real-world entity (e.g., a patient predictive entity) whose associated features and/or activities are inputs and outputs of a predictive model, e.g., the hybrid-input predictive model 461. A training text data object 421 may be a medical note document object, where a medical note document object may be any data object that includes unstructured data about one or more medical matters, such as one or more medical matters related to one or more patients. An example of a training text data object 421 is a physician-provided medical note document object used for training the hybrid-input predictive model 461.

As depicted in FIG. 4, the vocabulary generation unit 413 processes the training text data objects 421 to generate the vocabulary data object 422. In some embodiments, the vocabulary data object 422 identifies one or more tokenized terms based at least in part on the terms used in the training text data objects 421 and a per-term tokenized representation (e.g., a per-term numeric representation) for each tokenized term of the one or more tokenized terms. In some embodiments, the one or more tokenized terms are determined based at least in part on each cross-object frequency measure for a selected training term of one or more selected training terms used in one or more training text data objects 421.

In some embodiments, to generate the vocabulary data object 422, the vocabulary generation unit 413 performs the steps/operations depicted in FIG. 6. The process depicted in FIG. 6 begins at step/operation 601 when the vocabulary generation unit 413 identifies one or more training terms used in the training text data objects 421. In some embodiments, the vocabulary generation unit 413 identifies a term as part of the one or more training terms used in the training text data objects 421 if the term is used in at least one of the one or more training text data objects 421. In some embodiments, the vocabulary generation unit 413 identifies all of the terms used in the one or more training text data objects 421 as the one or more training terms used in the training text data objects 421. In some embodiments, the vocabulary generation unit 413 identifies the one or more training terms based at least in part on one or more of various text processing techniques, such as based at least in part on named entity extraction, based at least in part on key phrase extraction, and/or the like.

At step/operation 602, the vocabulary generation unit 413 determines one or more selected training terms of the one or more training terms identified in step/operation 601 in accordance with one or more term exclusion criteria. In some embodiments, the vocabulary generation unit 413 filters the training terms identified in step/operation 601 in accordance with particular exclusion criteria in order to obtain a refined list of the training terms identified in step/operation 601.

For example, in accordance with a first exclusion criterion, the vocabulary generation unit 413 may exclude training terms deemed to be stop words from the training terms identified in step/operation 601 in order to determine the one or more selected training terms. As another example, in accordance with a second exclusion criterion, the vocabulary generation unit 413 may exclude training terms deemed to include confidential information (e.g., patient identifying information and/or patient history information) from the training terms identified in step/operation 601 in order to determine the one or more selected training terms. As yet another example, in accordance with a third exclusion criterion, the vocabulary generation unit 413 may exclude training terms deemed to be semantically meaningless from the training terms identified in step/operation 601 in order to determine the one or more selected training terms. As a further example, in accordance with a fourth exclusion criterion, the vocabulary generation unit 413 may exclude training terms deemed to be misspelled and/or deemed to be products of typographical errors from the training terms identified in step/operation 601 in order to determine the one or more selected training terms.

At step/operation 603, the vocabulary generation unit 413 determines, for each selected training term determined in step/operation 602, a cross-object frequency measure across the one or more training text data objects 421. The cross-object frequency measure for a selected training term may be a measure of statistical distribution of each per-object frequency measure of the selected training term in a corresponding training text data object 421, while the per-object frequency measure of a selected training term in a particular training text data object 421 may be a measure of frequency of usage of the selected training term in the particular training text data object 421.

For example, given a set of two training text data objects 421 (e.g., three training text documents) as well as two selected training terms, the vocabulary generation unit 413 may generate nine per-object frequency measures $O_{1,1}$, $O_{1,2}$, $O_{2,1}$, and $O_{2,2}$, where $O_{i,j}$ is the per-object frequency measure of the ith selected training term in the jth training text document object. Thereafter, the vocabulary generation unit 413 may adopt a measure of statistical distribution of $O_{1,1}$ and $O_{1,2}$ as the cross-object frequency measure for the first selected training term and a measure of statistical distribution of $O_{2,1}$ and $O_{2,2}$ as the cross-object frequency measure for the second selected training term. Examples of per-object frequency measures include nominal frequency measures, relative frequency measures (e.g., Term Frequency Inverse Domain Frequency (TF-IDF) measures), and/or the like.

Examples of statistical distribution measures used to generate cross-object frequency measures include statistical distributions that describe a mean of a group of per-object frequency measures, statistical distributions that describe a median of a group of per-object frequency measures, statistical distributions that describe a standard deviation of a group of per-object frequency measures, statistical distributions that describe a mode of a group of per-object frequency measures, statistical distributions that describe a maximum value of a group of per-object frequency measures, statistical distributions that describe a minimum value of a group of per-object frequency measures, and/or the like.

At step/operation 604, the vocabulary generation unit 413 determines the one or more tokenized terms based at least in part on each cross-object frequency measure for a selected training term of the one or more selected training terms. In some embodiments, to determine the one or more tokenized terms, the vocabulary generation unit 413 determines a qualified subset of the one or more selected training terms whose respective cross-object frequency measures fall within a particular range of cross-object frequency measure (e.g., whose cross-object frequency measures are above a minimal cross-object frequency measure threshold and/or whose cross-object frequency measures are below a maximal cross-object frequency measure threshold). In some of the noted embodiments, the vocabulary generation unit 413 adopts the qualified selected subset as the one or more tokenized terms associated with the vocabulary data object 422. In some other of the noted embodiments, the vocabulary generation unit 413 forms one or more n-grams each composed of a respective combination of the terms in the qualified selected subset and adopts the one or more n-grams as the one or more tokenized terms associated with the vocabulary data object 422.

For example, in some embodiments, the vocabulary generation unit 413 may determine that particular ordered combinations of the terms in the qualified subset are frequently used together. In some of the noted embodiments, the vocabulary generation unit 413 may include n-grams corresponding to the particular ordered combinations as part of the determined tokenized terms associated with the vocabulary data object 422. As another example, in some embodiments, the vocabulary generation unit 413 may determine that particular ordered combinations of the terms in the qualified subset corresponds to phrases deemed meaningful based at least in part on one or more dictionary data objects. In some of the noted embodiments, the vocabulary generation unit 413 may include n-grams corresponding to the particular ordered combinations as part of the determined tokenized terms associated with the vocabulary data object 422.

At step/operation 605, the vocabulary generation unit 413 determines the per-term tokenized representation for each tokenized term determined in step/operation 604. In some embodiments, to determine the per-term tokenized representation for a tokenized term, the vocabulary generation unit 413 generates a numeric representation of the tokenized term. For example, the vocabulary generation unit 413 may generate a numeric representation of a tokenized term based at least in part on numeric representations (e.g., American Standard Code for Information Interchange (ASCII) representations, Unicode representations, and/or the like) of characters of the tokenized term. As another example, the vocabulary generation unit 413 may generate a numeric representation of a tokenized term based at least in part on mapping numeric representations of characters of the tokenized term to a multi-character vector representation.

At step/operation 606, the vocabulary generation unit 413 generates the vocabulary data object 422 based at least in part on each tokenized term determined in step/operation 604 and each per-term tokenized representation determined in step/operation 605. In some embodiments, the vocabulary generation unit 413 generates the vocabulary data object 422 as a data object that includes an indication of each tokenized term determined in step/operation 604, an indication of each per-term tokenized representation determined in step/operation 605, and a mapping between each tokenized term and its corresponding per-term tokenized representation. In some embodiments, the vocabulary data object 422 is a two-dimensional array data object.

An operational example of a vocabulary data object 700 is presented in FIG. 7. As depicted in FIG. 7, the vocabulary data object 700 is associated with the tokenized terms "no," "fever," "change," "bowel," and "urinary." As further depicted in FIG. 7, the vocabulary data object 700 indicates that the tokenized term "no" is associated with the per-term tokenized representation 0001; the tokenized term "fever" is associated with the per-term tokenized representation 0008; the tokenized term "change" is associated with the per-term tokenized representation 0002; the tokenized term "bowel" is associated with the per-term tokenized representation 0033; and the tokenized term "urinary" is associated with the per-term tokenized representation 0035.

Returning to FIG. 4, offline phase 401 of the process 400 continues when the vocabulary generation unit 413 provides the vocabulary data object 422 to a tokenizer unit 431 of the predictive data analysis computing entity 106. Afterward, during the offline phase 401, the tokenizer unit 431 retrieves the training text data objects 421 from the training text data unit 411 of the storage subsystem 108 and utilizes the vocabulary data object 422 to generate a per-training-entity tokenized representation 423 for each training predictive entity based at least in part on the retrieved training text data objects 421 for the training predictive entity.

In some embodiments, to generate the per-training-entity tokenized representation 423 for a particular training predictive entity based at least in part on the particular training text data objects 421 associated with the particular training predictive entity, the tokenizer unit 431 performs the steps/operations described in FIG. 8. The process 431A depicted in FIG. 8 begins at step/operation 801 when the tokenizer unit 431 identifies one or more training terms used in the particular training text data objects 421 associated with the particular training predictive entity. In some embodiments, the tokenizer unit 431 identifies a term as part of the one or more training terms used in the particular training text data objects 421 associated with the particular training predictive entity if the term is used in at least one of the particular one or more training text data objects 421. In some embodiments, the tokenizer unit 431 identifies the one or more training terms based at least in part on one or more of various text processing techniques, such as based at least in part on named entity extraction, based at least in part on key phrase extraction, and/or the like.

At step/operation 802, the tokenizer unit 431 determines one or more mapped training terms of the one or more training terms determined in step/operation 801 based at least in part on the vocabulary data object 422. In some embodiments, the tokenizer unit 431 determines the one or more mapped training terms based at least in part on a subset of the one or more training terms determined in step/operation 801 that correspond to at least one of the tokenized terms identified by the vocabulary data object 422. In some embodiments, the tokenizer unit 431 identifies the noted subset of the one or more training terms as the one or more mapped training terms of the one or more training terms determined in step/operation 801.

At step/operation 803, the tokenizer unit 431 determines a per-term tokenized representation for each mapped training term determined in step/operation 802 based at least in part on the vocabulary data object 422. In some embodiments, the tokenizer unit 431 retrieves, for each mapped training term determined in step/operation 802, the corresponding per-term tokenized representation for the mapped training term as indicated by the term-token relationships of the vocabulary data object 422. In some embodiments, the tokenizer unit 431 adopts the corresponding per-term tokenized representation for a particular mapped training term as indicated by the term-token relationships of the vocabulary data object 422 as the per-term tokenized representation for the particular mapped training term.

At step/operation 804, the tokenizer unit 431 generates the per-training-entity tokenized representation 423 associated with the particular training predictive entity based at least in part on each per-term tokenized representation determined in step/operation 803. In some embodiments, to generate the per-training-entity tokenized representation 423 associated with the particular training predictive entity based at least in part on each per-term tokenized representation determined in step/operation 803, the tokenizer unit 431 may group the per-term tokenized representations based at least in part on co-occurrence relationships between the corresponding training mapped terms associated with the per-tokenized representations in the particular training text data objects 421 in order to generate per-group tokenized representations (e.g., per-sentence tokenized representations, per-paragraph tokenized representations, per-document tokenized representations, and/or the like) for the training text data objects 421. The tokenizer unit 431 may then generate the per-training-entity tokenized representation 423 for the particular training predictive entity as a combination of the noted per-group tokenized representations for the training text data objects 421 associated with the particular training predictive entity.

For example, in some embodiments, the tokenizer unit 431 may generate a per-sentence tokenized representation for each sentence of the particular training text data objects 421 associated with the particular training predictive entity based at least in part on an ordered sequence of per-term tokenized representations associated with the mapped training terms used in the sentence. As another example, in some embodiments, the tokenizer unit may generate a per-object tokenized representation for each training text data object 421 (e.g., for each training text document) associated with the particular training predictive entity based at least in part on an ordered sequence of per-term tokenized representations associated with the mapped training terms used in training text data object 421. As a further example, in some embodiments, the tokenizer unit may generate a per-paragraph tokenized representation for each paragraph of the training text data objects 421 associated with the particular training predictive entity based at least in part on an ordered sequence of per-term tokenized representations associated with the mapped training terms used in training text data object 421. The tokenizer unit 431 may then generate the per-training-entity tokenized representation 423 associated with the particular training predictive entity as a combination of the noted per-sentence tokenized representations, the noted per-object tokenized representations, and/or the noted per-paragraph tokenized representations.

FIG. 10 depicts an operational example of a per-training-entity tokenized representation 1000 for a training predictive entity associated with the training text data object 900 of FIG. 9 that is determined solely based at least in part on the training text data object 900. As depicted in FIG. 9, the training text data object 900 of FIG. 9 is associated with two sentences: a first sentence 901 having the mapped training terms "no" and "fever" and a second sentence 902 having the mapped terms "no," "change," "bowel," and "urinary." Thus, in accordance with the per-term tokenized representations indicated in the vocabulary data object 700 of FIG. 7, the per-training-entity tokenized representation 1000 includes a first per-sentence tokenized representation 1001 for the first sentence 901 that includes an ordered sequence of the per-term tokenized representations of the mapped training terms "no" and "fever." Moreover, in accordance with the per-term tokenized representations indicated in the vocabulary data object 700 of FIG. 7, the per-training-entity tokenized representation 1000 includes a second per-sentence tokenized representation 1002 for the first sentence 901 that includes an ordered sequence of the per-term tokenized representations of the mapped training terms "no," "change," "bowel," and "urinary."

Returning to FIG. 4, the offline phase 401 of the process 400 continues when the tokenizer unit 431 provides the per-training-entity tokenized representation 423 for each training predictive entity to a training unit 414 of the predictive data analysis computing entity 106. The training unit 414 may be configured to retrieve training structured data objects 424 for each training predictive entity from a training structured data unit 412 of the storage subsystem 108 and utilize the per-training-entity tokenized representation for each training predictive entity and the training structured data object 424 for each training predictive entity in order to generate a trained hybrid-input predictive model 428.

In some embodiments, to generate the trained hybrid-input predictive model 428, the training unit 414 performs the steps/operations described in FIG. 11. The process depicted in FIG. 11 begins at step/operation 1101 when the training unit 414 identifies one or more training predictive entities each associated with a first selected subset of the one or more training text data objects and a second selected subset of one or more training structured data objects. For example, the training predictive entities may correspond to one or more patient profiles, where each patient profile is associated with particular training text data objects (e.g., particular physician notes for physician visits associated with the patient profile) and particular structured data objects (e.g., structured objects that indicate demographic information of the patient profile, structured objects that indicate previous physician determinations about necessity of inpatient care for the patient profile in the past, and/or the like).

At step/operation 1102, the training unit 414 determines, for each training predictive entity identified in step/operation 1101, a measure of training deviation between an inferred predictive output for the training predictive entity and a ground-truth predictive output for the training predictive entity. In some embodiments, each inferred predictive output for a training predictive entity of the one or more training predictive entities is determined by processing the first selected subset for the training predictive entity and the second selected subset for the training predictive entity using a hybrid-input predictive model. In some embodiments, to determine a measure of training deviation for a training predictive entity, the training unit 414 uses current parameters of the hybrid-input predictive model to generate the inferred predictive output for the training predictive entity. Thereafter, the training unit 414 computes a difference between the inferred predictive output for the training predictive entity and a ground-truth predictive output for the trained predictive entity and uses the computed difference to determine the measure of training deviation for the training predictive entity.

For example, if the inferred predictive output indicates that a corresponding patient training predictive entity should be classified as an observation case but the ground-truth predictive output indicates that the corresponding patient training predictive entity should be classified as an outpatient case, the training unit 414 may determine a measure of deviation that indicates an incorrect prediction by the current parameters of the hybrid-input predictive model. As another example, if the inferred predictive output indicates that a current condition of a corresponding patient training predictive entity has a degree of urgency of 20% but the ground-truth predictive output indicates that the current condition of the corresponding patient training predictive entity has a degree of urgency of 80%, the training unit 414 may determine a measure of deviation that indicates a 60% inaccuracy in the prediction performed by the current parameters of the hybrid-input predictive model.

To perform the inferred predictive output for a training predictive entity, the training unit 414 utilizes current values of the parameters of the hybrid-input predictive model. The hybrid-input predictive model may be a machine learning model that is configured to process at least one text-based data input and at least one structured-data-based input in order to generate a predictive output. For example, the hybrid-input predictive model may be configured to process a text-based data input that includes at least one tokenized representation of a text document and at least one structured data object in order to determine a prediction score for a predictive entity associated with the text data object and the structured data object. As another example, the hybrid-input predictive model may be configured to process a text-based data input that includes at least one tokenized representation of a text data object and at least one structured data object in order to generate an attention vector that indicates a relative predictive significance value for each linguistic entity (e.g., term, sentence, paragraph, and/or the like) used in the text data object to a current state of a predictive entity associated with the text document and the structured data object.

The parameters of the hybrid-input predictive model may be defined by a structure of the hybrid-input predictive model. An operational example of a structure for the hybrid-input predictive model 1200 is presented in FIG. 12. As depicted in FIG. 12, the hybrid-input predictive model 1200 is configured to process a text-based input 1201 and a structured-data-based input 1202 in order to generate a prediction score 1215 and a term-level attention vector 1213 for a text data object associated with the text-based input 1201.

As depicted in FIG. 12, the hybrid-input predictive model 1200 includes an embedding layer 1204 configured to generate a per-term embedding 1211 for each term used in the text data object associated with the text-based input 1201. As further depicted in FIG. 12, the hybrid-input predictive model 1200 includes a long-short term memory (LSTM) layer 1205 configured to process the per-term embeddings 1211 and the structured-data-based input 1202 using an LSTM machine learning model (e.g., a bidirectional LSTM machine learning model) to generate an LSTM output 1212 (e.g., a hidden state of a final timestep of the LSTM machine learning model), which the LSTM layer 1205 then provides to an attention calculation layer 1206 as well as an attention scaler layer 1207. The attention calculation layer 1206 is configured to process the LSTM output 1212 to generate an attention vector 1213, which the attention calculation layer 1206 can both provide as an output of the hybrid-input predictive model 1200 and as an input to the attention scaler layer 1207. The output provided by the attention calculation layer 1206 can be used to generate a highlighted text input data object by highlighting portions of the text data object associated with the text-based input 1201 that are deemed to have greater predictive significance, e.g., using the highlights such as highlight 1601 in the highlighted text data object 1600 of FIG. 6, where the color intensity of a highlight may determine the intensity of the predictive significance of the corresponding highlighted portion.

As further depicted in FIG. 12, the attention scaler layer 1207 of the hybrid-input predictive model 1200 may process the attention vector 1213 to generate an attention scalar value 1214, which can be used by discriminant layers 1208 to generate a prediction score 1215. In some embodiments, the discriminant layers 1208 include one or more dense layers and one or more classifier layers. In some embodiments, the one or more dense layers may be configured to process inputs in accordance with supplied parameters in order to generate an activation value, where the activation value can then be utilized by a non-linear activation function to generate a dense layer output. In some embodiments, the convolutional layers are configured to generate a classification value for the corresponding predictive entity based at least in part on the dense layer output.

Returning to FIG. 11, at step/operation 1103, the training unit 414 updates one or more parameters of the hybrid-input predictive model based at least in part on each measure of training deviation determined in step/operation 1102. In some embodiments, to update the one or more parameters of the hybrid-input predictive model based at least in part on each measure of training deviation determined in step/operation 1102, the training unit 414 utilizes an optimization algorithm, such as gradient descent, gradient descent with backpropagation, gradient descent with backpropagation through time, and/or the like.

Returning to FIG. 4, the offline phase 401 of the process 400 continues when the training unit 414 provides the trained hybrid-input predictive model 428 to a validation unit 415 of the predictive data analysis computing entity 106. The validation unit 415 is configured to determine a validation score for the trained hybrid-input predictive model 428 which indicates whether the trained hybrid-input predictive model 428 is a reliable predictive model. If the validation unit 415 determines a validation score that indicates that the trained hybrid-input predictive model 428 is a reliable predictive model, the validation unit 415 adopts the trained hybrid-input predictive model 428 as the hybrid-input predictive model 461 and transmits the hybrid-input predictive model 461 to a prediction unit 443 of the predictive data analysis computing entity 106. However, if the validation unit 415 determines a validation score that indicates that the trained hybrid-input predictive model 428 is not a reliable predictive model, the validation unit 415 does not adopt the trained hybrid-input predictive model 428 as the hybrid-input predictive model 461 and requests that the training unit 414 to train a new trained hybrid-input predictive model.

In some embodiments, to generate the validation score for the trained hybrid-input predictive model 428, the validation unit 415 performs the steps/operations described in FIG. 13. The process depicted in FIG. 13 begins at step/operation 1301 when the validation unit 415 identifies one or more testing predictive entities each associated with a first selected subset of the one or more training text data objects and a second selected subset of one or more training structured data objects. For example, the testing predictive entities may correspond to one or more patient profiles, where each patient profile is associated with particular training text data objects (e.g., particular physician notes for physician visits associated with the patient profile) and particular structured data objects (e.g., structured objects that indicate demographic information of the patient profile, structured objects that indicate previous physician determinations about necessity of inpatient care for the patient profile in the past, and/or the like).

At step/operation 1302, the validation unit 415 training unit determines, for each testing predictive entity identified in step/operation 1301, a measure of testing deviation between an inferred predictive output for the testing predictive entity and a ground-truth predictive output for the testing predictive entity. In some embodiments, each inferred predictive output for a testing predictive entity of the one or more testing predictive entities is determined by processing the first selected subset for the testing predictive entity and the second selected subset for the testing predictive entity using the trained hybrid-input predictive model 428. In some embodiments, to determine a measure of testing deviation for a training predictive entity, the validation unit 415 uses the parameters of the trained hybrid-input predictive model 428 to generate the inferred predictive output for the testing predictive entity. Thereafter, the validation unit 415 computes a difference between the inferred predictive output for the testing predictive entity and a ground-truth predictive output for the testing predictive entity and uses the computed difference to determine the measure of testing deviation for the testing predictive entity.

For example, if the inferred predictive output indicates that a corresponding patient testing predictive entity should be classified as an observation case but the ground-truth predictive output indicates that the corresponding patient testing predictive entity should be classified as an outpatient case, the validation unit 415 may determine a measure of deviation that indicates an incorrect prediction by the current parameters of the hybrid-input predictive model. As another example, if the inferred predictive output indicates that a current condition of a corresponding patient testing predictive entity has a degree of urgency of 20% but the ground-truth predictive output indicates that the current condition of corresponding patient testing predictive entity corresponding patient training predictive entity has a degree of urgency of 80%, the validation unit 415 may determine a measure of deviation that indicates a 60% inaccuracy in the prediction performed by the current parameters of the hybrid-input predictive model.

At step/operation 1303, the validation unit 415 determines a validation score for the trained hybrid-input predictive model 428 based at least in part on each measure of testing deviation determined in step/operation 1302. In some embodiments, the validation unit 415 determines a measure of statistical distribution of each measure of testing deviation determined in step/operation 1302 and determines the validation score based at least in part on the measure of statistical distribution. In some embodiments, the validation unit 415 determines a measure of statistical distribution of each measure of testing deviation determined in step/operation 1302 and adopts the measure of statistical distribution as the validation score. Examples of measures of statistical distribution include mean values, median values, standard deviation values, variance values, maximum values, minimum values, mode values, and/or the like.

Returning to FIG. 4, the offline phase 401 of the process 400 continues when the training unit 414 provides training predictive outputs 425 (i.e., at least some of the inferred predictive outputs generated by the training unit 414 during the training process) to a threshold recommendation unit 416 of the predictive data analysis computing entity 106. Moreover, the validation unit 415 provides testing predictive outputs 427 (i.e., the inferred predictive outputs generated by the training unit 414 during the testing process) to a threshold recommendation unit 416 of the predictive data analysis computing entity 106. The threshold recommendation unit 416 may also receive one or more offline threshold configuration data objects, e.g., one or more end-user-supplied offline threshold configuration data objects.

The threshold recommendation unit 416 may then process the training predictive outputs 425, the testing predictive outputs 427, and/or the one or more offline threshold configuration data objects to generate an offline threshold recommendation 429, which the threshold recommendation unit 416 then supplies to a threshold finalization unit 444 of the predictive data analysis computing entity 106. In some embodiments, the threshold recommendation unit 416 determines the offline threshold recommendation 429 based at least in part on a measure of statistical distribution of the training predictive outputs 425 and/or the testing predictive outputs 427. Examples of measures of statistical distribution include mean values, median values, standard deviation values, variance values, maximum values, minimum values, mode values, and/or the like. In some embodiments, the threshold recommendation unit 416 determines the offline threshold recommendation 429 based on one or more user-supplied rules (e.g., one or more business rules) and/or one or more user-supplied threshold input values.

2. Exemplary Online Phase of Hybrid Input Predictive Data Analysis

As further depicted in FIG. 4, the online phase 402 of the process 400 begins when the tokenizer unit 431 retrieves one or more prediction input text data objects 451 associated with an input predictive entity from a prediction input text data unit 441 of the storage subsystem 108. An example of a prediction input text data object 451 may be a text object describing a current condition of a person, e.g., a physician note documenting a medical visit of a patient predictive entity. The tokenizer unit 431 is, during the online phase 402, configured to generate a per-input-entity tokenized representation 452 of the prediction input text data objects 451 based at least in part on the vocabulary data object 422 generated during the offline phase 401 of the process 400.

A prediction input text data object 451 may be a medical note document object, where a medical note document object may be any data object that includes unstructured data about one or more medical matters, such as one or more medical matters related to one or more patients. An example of a prediction input data object 451 is a physician-provided medical note document object.

In some embodiments, to generate the per-input-entity tokenized representation 452 of the prediction input text data objects 451, the tokenizer unit 431 performs the steps/operations depicted in FIG. 14. The process 431B depicted in FIG. 14 begins at step/operation 1401 when the tokenizer unit 431 identifies one or more input terms used in the prediction input text data object 451 associated with the input predictive entity. In some embodiments, the tokenizer unit 431 identifies a term as part of the one or more input terms if the term is used in at least one of the prediction input text data objects 451. In some embodiments, the tokenizer unit 431 identifies the one or more input terms based at least in part on one or more of one or more of various text processing techniques, such as based at least in part on named entity extraction, based at least in part on key phrase extraction, and/or the like.

At step/operation 1402, the tokenizer unit 431 determines one or more mapped input terms of the one or more input terms determined in step/operation 1401 based at least in part on the vocabulary data object 422. In some embodiments, the tokenizer unit 431 determines the one or more mapped input terms based at least in part on a subset of the one or more input terms determined in step/operation 1401 that correspond to at least one of the tokenized terms identified by the vocabulary data object 422. In some embodiments, the tokenizer unit 431 identifies the noted subset of the one or more input terms as the one or more mapped input terms of the one or more input terms determined in step/operation 801.

At step/operation 1403, the tokenizer unit 431 determines a per-term tokenized representation for each mapped input term determined in step/operation 1402 based at least in part on the vocabulary data object 422. In some embodiments, the tokenizer unit 431 retrieves, for each mapped input term determined in step/operation 1402, the corresponding per-term tokenized representation for the mapped input term as indicated by the term-token relationships of the vocabulary data object 422. In some embodiments, the tokenizer unit 431 adopts the corresponding per-term tokenized representation for a particular mapped input term as indicated by the term-token relationships of the vocabulary data object 422 as the per-term tokenized representation for the particular mapped input term.

At step/operation 1404, the tokenizer unit 431 generates the per-input-entity tokenized representation 452 associated with the particular input predictive entity based at least in part on each per-term tokenized representation determined in step/operation 1403. In some embodiments, to generate the per-input-entity tokenized representation 452 associated with the input predictive entity based at least in part on each per-term tokenized representation determined in step/operation 1403, the tokenizer unit 431 may group the per-term tokenized representations based at least in part on co-occurrence relationships between the corresponding input mapped terms associated with the per-tokenized representations in the prediction input text data objects 451 in order to generate per-group tokenized representations (e.g., per-sentence tokenized representations, per-paragraph tokenized representations, per-document tokenized representations, and/or the like) for the prediction input text data objects 451. The tokenizer unit 431 may then generate the per-input-entity tokenized representation 452 as a combination of the noted per-group tokenized representations for the prediction input text data objects 451.

For example, in some embodiments, the tokenizer unit 431 may generate a per-sentence tokenized representation for each sentence of the particular prediction input text data objects 451 based at least in part on an ordered sequence of per-term tokenized representations associated with the input mapped terms used in the sentence.

As another example, in some embodiments, the tokenizer unit may generate a per-object tokenized representation for each prediction input text data object 451 (e.g., for each prediction input text document) based at least in part on an ordered sequence of per-term tokenized representations associated with the input mapped terms used in prediction input text data object 451.

As a further example, in some embodiments, the tokenizer unit may generate a per-paragraph tokenized representation for each paragraph of the prediction input text data objects 451 associated with the particular prediction input predictive entity based at least in part on an ordered sequence of per-term tokenized representations associated with the input mapped terms used in prediction input text data object 451. The tokenizer unit 431 may then generate the per-input-entity tokenized representation 452 as a combination of the noted per-sentence tokenized representations, the noted per-object tokenized representations, and/or the noted per-paragraph tokenized representations.

Returning to FIG. 4, the online phase 402 of the process 400 continues when the tokenizer unit 431 provides the per-input-entity tokenized representation 452 associated with the input predictive entity to a prediction unit 443 of the predictive data analysis computing entity 106. The prediction unit 443 is further configured to retrieve one or more prediction input structured data objects 453 from an input structured data unit 442 of the storage subsystem 108 and receive the hybrid-input predictive model 471 from the validation unit 415. Thereafter, the prediction unit 443 is configured to process the per-input-entity tokenized representation 452 and the prediction input structured data objects 453 in accordance with the hybrid-input predictive model 471 to generate a prediction score 454 for the predictive entity. In some embodiments, the prediction score 454 indicates a predicted degree of association of the input predictive entity to one or more prediction classifications. For example, the prediction score 454 may indicate the likelihood that a patient input predictive entity is associated with an inpatient case, an observation case, or both.

As further depicted in FIG. 4, the online phase 402 of the process 400 continues when a threshold finalization unit 444 of the predictive data analysis computing entity 106 receive the offline threshold recommendation 429 generated by the threshold recommendation unit 416 during the offline phase 401 of the process 400. The threshold finalization unit 444 generates a predictive threshold 455 based at least in part on the offline threshold recommendation 429 generated by the threshold recommendation unit 416 during the offline phase 401. In some embodiments, the threshold finalization unit 444 optionally adjusts the offline threshold recommendation 429 in accordance with one or more online threshold configuration data objects, e.g., one or more end-user-supplied online threshold configuration data objects, supplied during the online phase 402 in order to generate the predictive threshold 455.

In some embodiments, the offline phase 401 of the process 400 comprises, subsequent to generating the hybrid input predictive model, generating an offline predictive threshold recommendation based at least in part on a distribution of one or more inferred prediction scores generated by the validated hybrid-input predictive model. In some of the noted embodiments, the predictive threshold is determined based at least in part on the offline predictive threshold recommendation.

As further depicted in FIG. 4, the online phase 402 of the process 400 continues when the prediction unit 443 provides the prediction score 454 for the input predictive entity to a threshold application unit 445 of the predictive data analysis computing entity 106. Moreover, the threshold finalization unit 444 provides the predictive threshold 455 to the threshold application unit 445. The threshold application unit 445 may be configured to generate a predictive output 454 in response to determining that the prediction score 454 supplied by the prediction unit 443 exceeds the predictive threshold 455 supplied by the threshold finalization unit 444. The predictive output 454 may include one or more of a predicted classification of the input predictive entity, a predicted attention-based vector over the prediction input text data objects 451, and/or the like.

As further depicted in FIG. 4, the online phase 402 of the process 400 continues when the threshold application unit 445 provides the predictive output 454 to a prediction-based action unit 446 of the predictive data analysis computing entity 106. The prediction-based action unit 446 may be configured to perform one or more prediction-based actions based at least in part on the predictive output 454. Examples of prediction-based actions may include automatic scheduling of appointments, automatic server load processing operations, automatic generation of notifications (e.g., to physicians and/or patients, and/or the like).

For example, the prediction-based action unit 446 may display at least a portion of the predictive output 454 to an end-user of the predictive data analysis computing entity 106 (e.g., in a highlighted format, for instance as shown in the highlighted text data object 1600 of FIG. 16). As another example, the prediction-based action unit 446 may generate a task notification for a manual review of the input predictive entity based at least in part on the predictive output 454. As yet another example, the prediction-based action unit 446 may, based at least in part on the predictive output 454, automatically perform a detailed secondary review of the prediction input text data objects 451 and/or the prediction input structured data objects 453. As a further example, the prediction-based action unit 446 may, based at least in part on the predictive output 454, automatically schedule one or more medical appointments based at least in part on the predictive output.

In some embodiments, the predictive output 454 is a medical necessity prediction, where a medical necessity prediction may be a data object that indicates one or more predicted conclusions about medical necessity (e.g., about medical urgency, level of desired care, and/or the like) of one or more medical matters, such as one or more medical matters associated with one or more patients and/or one or more medical cases. An example of a medical necessity prediction is a data object that indicates whether a corresponding medical case is an inpatient case or an observation case. Another example of a medical necessity prediction is a data object that indicates whether a corresponding medical case is an emergency case. A further example of a medical necessity prediction is a data object that indicates whether a corresponding medical case is a case best handled by an intensive care unit (ICU).

In some embodiments, the predictive output 454 indicates a prediction about whether a patient predictive entity is associated with an inpatient case or an observation case. As depicted in the process 1500 of FIG. 15, in some of the noted embodiments, if the noted prediction differs from a physician-provided evaluation, the prediction-based action unit 446 may cause a second-level review of the medical case by a third-party agent to determine a final evaluation about whether the patient predictive entity is associated with an inpatient case or an observation case. In some embodiments, the prediction-based action unit 446 generates a task notification in response to determining a need for a second-level review of the medical case by a third-party agent. In some embodiments, the prediction-based action unit 446 performs one or more operational load balancing actions (e.g., by reassigning tasks assigned to particular agents) based at least in part on determining a need for a new second-level review of the medical case by a third-party agent.

In some embodiments, the predictive entity is a patient predictive entity, the patient predictive entity is associated with a practitioner level-of-care evaluation, the predictive output is a predicted level-of-care evaluation for the patient predictive entity, the one or more predictive actions comprise a secondary review predictive action, and the secondary review prediction action comprises, in response to determining that the practitioner evaluation level-of-care evaluation deviates from the predicted level-of-care evaluation, providing data associated with the predictive entity to a secondary review agent for determining a final level-of-care evaluation for the predictive entity.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
  receiving, by one or more processors, a vocabulary data object associated with an input text data object for an entity, wherein:
  (i) the vocabulary data object identifies (a) one or more tokenized terms and (b) a per-term numeric representation for each of the one or more tokenized terms,
  (ii) the one or more tokenized terms are determined based at least in part on a cross-object frequency measure for a selected training term from one or more training text data objects, and

(iii) the input text data object comprises a medical note for the entity;

determining, by the one or more processors and based at least in part on the vocabulary data object, a per-input-entity tokenized representation for the input text data object, wherein:
(i) the input text data object comprises a plurality of input terms,
(ii) the plurality of input terms comprises one or more mapped input terms associated with one or more predetermined per-term numeric representations in the vocabulary data object, and
(iii) the per-input-entity tokenized representation comprises an ordered sequence of the one or more predetermined per-term numeric representations from the vocabulary data object that are associated with the one or more mapped input terms;

generating, by the one or more processors and using a hybrid-input predictive model, a prediction score for the entity based at least in part on (a) the per-input-entity tokenized representation and (b) an input structured data object associated with the entity, generating, by the one or more processors and based at least in part on the prediction score satisfying a predictive threshold, a predictive output associated with the entity, wherein the predictive output comprises a medical prediction for the entity; and initiating, by the one or more processors, the performance of one or more prediction-based actions based at least in part on the predictive output.

2. The computer-implemented method of claim 1, wherein the vocabulary data object and the hybrid-input predictive model are generated during an offline phase.

3. The computer-implemented method of claim 2, wherein the offline phase comprises:
identifying one or more training predictive entities, wherein a training entity of the one or more training entities is associated with (a) a first subset of the one or more training text data objects and (b) a second subset of one or more training structured data objects;
determining a measure of training deviation between (a) an inferred predictive output for the training entity and (b) a ground-truth predictive output for the training entity, wherein the inferred predictive output for the training entity is determined by processing the first subset and the second subset using the hybrid-input predictive model; and
updating one or more parameters of the hybrid-input predictive model based at least in part on the measure of training deviation.

4. The computer-implemented method of claim 2, wherein the offline phase comprises:
identifying a plurality of training terms from the one or more training text data objects; and
identifying one or more selected training terms from the plurality of training terms based at least in part on an exclusion criterion.

5. The computer-implemented method of claim 2, wherein the offline phase comprises determining to adopt a trained hybrid-input predictive model as the hybrid-input predictive model by:
identifying one or more testing predictive entities, wherein a testing entity of the one or more testing entities is associated with (a) a first subset of one or more testing text data objects and (b) a second subset of one or more testing structured data objects;
determining a measure of testing deviation between (a) an inferred predictive output for the testing entity and (b) a ground-truth predictive output for the testing entity, wherein the inferred predictive output for the testing entity is determined by processing the first subset and the second subset using hybrid-input predictive model;
determining a validation score for the trained hybrid-input predictive model based at least in part on the measure of testing deviation; and
determining to adopt the trained hybrid-input predictive model as the hybrid-input predictive model based at least in part on the validation score.

6. The computer-implemented method of claim 2, wherein:
the offline phase comprises, after generating the hybrid-input predictive model, generating an offline predictive threshold recommendation based at least in part on a distribution of one or more inferred prediction scores; and
the predictive threshold is determined based at least in part on the offline predictive threshold recommendation.

7. The computer-implemented method of claim 1, wherein the predictive output is generated during an online phase.

8. The computer-implemented method of claim 1, wherein:
the input text data object comprises one or more input sentences, and
the per-input-entity tokenized representation comprises a respective ordered sequence of predetermined per-term numeric representations for each input sentence of the one or more input sentences.

9. The computer-implemented method of claim 1, wherein the predictive threshold for the hybrid-input predictive model is determined during an offline phase and is adjusted during an online phase.

10. The computer-implemented method of claim 1, wherein the hybrid-input predictive model comprises one or more long-short term memory (LSTM) machine learning models.

11. The computer-implemented method of claim 1, wherein:
the entity is associated with a patient,
the patient is associated with a practitioner level-of-care evaluation,
the predictive output is a predicted level-of-care evaluation for the patient,
the one or more prediction-based actions comprise a secondary review action, and
the secondary review action comprises:
in response to determining that the practitioner level-of-care evaluation deviates from the predicted level-of-care evaluation, providing data associated with the entity to a secondary review agent for determining a final level-of-care evaluation for the entity.

12. An apparatus comprising one or more processors and memory including program code, the memory and the program code configured to, with the one or more processors, cause the apparatus to at least:
receive a vocabulary data object associated with an input text data object for an entity, wherein:
(i) the vocabulary data object identifies (a) one or more tokenized terms and (b) a per-term numeric representation for each of the one or more tokenized terms, (ii) the one or more tokenized terms are determined based at least in part on a cross-object frequency measure for a selected training term from one or more training text data objects, and (iii) the input text data object comprises a medical note for the entity;

determine, based at least in part on the vocabulary data object, a per-input-entity tokenized representation for the input text data object, wherein:

(i) the input text data object comprises a plurality of input terms, (ii) the plurality of input terms comprises one or more mapped input terms associated with one or more pre-determined per-term numeric representations in the vocabulary data object, and (iii) the per-input-entity tokenized representation comprises an ordered sequence of the one or more predetermined per-term numeric representations from the vocabulary data object that are associated with the one or more mapped input terms;

generate, using a hybrid-input predictive model, a prediction score for the entity based at least in part on (a) the per-input-entity tokenized representation and (b) an input structured data object associated with the entity;

generate, based at least in part on the prediction score satisfying a predictive threshold, a predictive output associated with the entity, wherein the predictive output comprises a medical prediction for the entity; and initiate the performance of one or more prediction-based actions based at least in part on the predictive output.

13. The apparatus of claim 12, wherein the vocabulary data object and the hybrid-input predictive model are generated during an offline phase.

14. The apparatus of claim 13, wherein the offline phase comprises:

identifying one or more training predictive entities, wherein a training entity of the one or more training entities is associated with (a) a first subset of the one or more training text data objects and (b) a second subset of one or more training structured data objects;

determining a measure of training deviation between (a) an inferred predictive output for the training entity and (b) a ground-truth predictive output for the training entity, wherein the inferred predictive output for the training entity is determined by processing the first subset and the second using the hybrid-input predictive model; and updating one or more parameters of the hybrid-input predictive model based at least in part on the measure of training deviation.

15. The apparatus of claim 13, wherein the offline phase comprises:

identifying a plurality of training terms from the one or more training text data objects; and identifying one or more selected training terms from the plurality of training terms based at least in part on an exclusion criterion.

16. A computer program product comprising a non-transitory computer-readable storage medium having computer-readable program code portions stored therein that, when executed by one or more processors, cause the one or more processors to:

receive a vocabulary data object associated with an input text data object for an entity, wherein:

(i) the vocabulary data object identifies (a) one or more tokenized terms and (b) a per-term numeric representation for each tokenized term, (ii) the one or more tokenized terms are determined based at least in part on a cross-object frequency measure for a selected training term from one or more training text data objects, and (iii) the input text data object comprises a medical note for the entity;

determine, based at least in part on the vocabulary data object, a per-input-entity tokenized representation for the input text data object, wherein:

(i) the input text data object comprises a plurality of input terms, (ii) the plurality of input terms comprises one or more mapped input terms associated with one or more pre-determined per-term numeric representations in the vocabulary data object, and (iii) the per-input-entity tokenized representation comprises an ordered sequence of the one or more predetermined per-term numeric representations from the vocabulary data object that are associated with the one or more mapped input terms;

generate, using a hybrid-input predictive model, a prediction score for the entity based at least in part on (a) the per-input-entity tokenized representation and (b) an input structured data object associated with the entity;

generate, based at least in part on the prediction score satisfying a predictive threshold, a predictive output associated with the entity, wherein the predictive output comprises a medical prediction for the entity; and initiate the performance of one or more prediction-based actions based at least in part on the predictive output.

17. The computer program product of claim 16, wherein the vocabulary data object and the hybrid-input predictive model are generated during an offline phase.

18. The computer program product of claim 17, wherein the offline phase comprises:

identifying one or more training entities, wherein a training entity is associated with (a) a first subset of the one or more training text data objects and (b) a second subset of one or more training structured data objects;

determining a measure of training deviation between (a) an inferred predictive output for the training entity and (b) a ground-truth predictive output for the training entity, wherein the inferred predictive output for the training entity is determined by processing the first subset and the second subset using the hybrid-input predictive model; and updating one or more parameters of the hybrid-input predictive model based at least in part on the measure of training deviation.

19. The computer program product of claim 18, wherein the offline phase comprises:

identifying a plurality of training terms from the one or more training text data objects; and identifying one or more selected training terms from the plurality of training terms based at least in part on an exclusion criterion.

* * * * *